(12) United States Patent
Kobayashi

(10) Patent No.: US 10,268,326 B2
(45) Date of Patent: Apr. 23, 2019

(54) SEMICONDUCTOR DEVICE, TOUCH PANEL, AND ELECTRONIC DEVICE

(71) Applicant: Semiconductor Energy Laboratory Co., Ltd., Atsugi-shi, Kanagawa-ken (JP)

(72) Inventor: Hidetomo Kobayashi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 41 days.

(21) Appl. No.: 15/183,922

(22) Filed: Jun. 16, 2016

(65) Prior Publication Data

US 2016/0370898 A1 Dec. 22, 2016

(30) Foreign Application Priority Data

Jun. 22, 2015 (JP) .................... 2015-124830

(51) Int. Cl.
  *G06F 3/041* (2006.01)
  *G06F 3/044* (2006.01)
  *G09G 3/36* (2006.01)

(52) U.S. Cl.
  CPC ............ *G06F 3/044* (2013.01); *G06F 3/0412* (2013.01); *G06F 3/0416* (2013.01); *G09G 3/3648* (2013.01); *G09G 2310/027* (2013.01); *G09G 2310/0286* (2013.01); *G09G 2310/0291* (2013.01)

(58) Field of Classification Search
CPC combination set(s) only.
See application file for complete search history.

(56) References Cited

U.S. PATENT DOCUMENTS

| | | | |
|---|---|---|---|
| 7,920,129 | B2 | 4/2011 | Hotelling et al. |
| 8,786,557 | B2 | 7/2014 | Noguchi et al. |
| 9,134,560 | B2 | 9/2015 | Hotelling et al. |
| 2008/0158183 | A1 | 7/2008 | Hotelling et al. |
| 2014/0055412 | A1 | 2/2014 | Teramoto |
| 2014/0145986 | A1 | 5/2014 | Kuroiwa et al. |
| 2014/0204041 | A1 | 7/2014 | Munechika |
| 2014/0267159 | A1 | 9/2014 | Miyazaki et al. |
| 2015/0091868 | A1 | 4/2015 | Nakanishi et al. |

FOREIGN PATENT DOCUMENTS

WO WO-2010/088666 8/2010

*Primary Examiner* — Van N Chow
(74) *Attorney, Agent, or Firm* — Fish & Richardson P.C.

(57) ABSTRACT

A source line through which a video signal is transmitted also serves as a driving electrode of a touch sensor. To perform display, a video signal is transmitted to the source line. To sense the touch, a driving signal is transmitted to the source line. A circuit for transmitting the video signal and the driving signal to the source line has a structure in which a period for transmitting the driving signal is added in the wiring through which the digital video signal is transmitted and the output to the source line is switched by using a switching circuit. Alternatively, the circuit has a structure in which a period for transmitting the driving signal is added in a wiring through which a latch signal is transmitted and the output to the source line is switched.

15 Claims, 21 Drawing Sheets

$P_{write}$ $P_{touch}$ $P_{write}$ $P_{touch}$

SEMICONDUCTOR DEVICE, TOUCH PANEL, AND ELECTRONIC DEVICE

BACKGROUND OF THE INVENTION

1. Field of the Invention

One embodiment of the present invention relates to a semiconductor device, a touch panel, and an electronic device.

Note that one embodiment of the present invention is not limited to the above technical field. The technical field of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

Touch panels have been more actively researched and developed than display devices which are externally provided with touch sensors, because of their thinness and low cost (see Patent Documents 1 and 2).

Structures for integration of integrated circuits (ICs) that drive display portions or touch sensors in touch panels have been proposed for the purposes of reduced power consumption and the like (see Patent Documents 3 and 4, for example).

REFERENCE

Patent Document

[Patent Document 1] United States Patent Application Publication No. 2015/0091868

[Patent Document 2] PCT International Publication No. 2010/088666

[Patent Document 3] United States Patent Application Publication No. 2014/0204041

[Patent Document 4] United States Patent Application Publication No. 2014/0145986

SUMMARY OF THE INVENTION

As described above, there are a variety of structures of semiconductor devices functioning as integrated circuits. Each structure has advantages and disadvantages, and a structure appropriate for circumstances is selected. Thus, a proposal for a semiconductor device that has a novel structure and functions as an integrated circuit leads to a higher degree of freedom of choice.

An object of one embodiment of the present invention is to provide a novel semiconductor device, a novel touch panel, a novel electronic device, or the like.

In the case where an integrated circuit that drives a display portion and an integrated circuit that drives a touch sensor are combined to form one integrated circuit, the sharing of the circuits allows further reductions in frame width and cost.

Another object of one embodiment of the present invention is to provide a semiconductor device or the like having a novel structure that enables reduced frame width or reduced cost.

Note that the objects of one embodiment of the present invention are not limited to the above objects. The objects described above do not disturb the existence of other objects. The other objects are the ones that are not described above and will be described below. The objects that are not described above will be apparent from and can be derived from the description of the specification, the drawings, and the like by those skilled in the art. One embodiment of the present invention solves at least one of the above objects and the other objects.

One embodiment of the present invention is a semiconductor device including a first wiring, a second wiring, a first circuit, and a second circuit. In the semiconductor device, the first wiring has a function of transmitting a video signal to a pixel, the first circuit is electrically connected to the second wiring, the first circuit has a function of sensing a change in capacitance between the first wiring and the second wiring, the second circuit is electrically connected to the first wiring, and the second circuit can switch between a function of outputting the video signal and a function of outputting a driving signal for sensing the change in capacitance.

In the semiconductor device of one embodiment of the present invention, the second circuit preferably includes a shift register, a first latch circuit, a second latch circuit, a D/A converter circuit, a switching circuit, and a buffer circuit; the first wiring preferably includes n wirings (n is a natural number of 2 or more); the first latch circuit is preferably electrically connected to j×p third wirings (j and p are each a natural number of 2 or more); the third wirings are preferably configured to transmit a p-bit digital signal which is the video signal and the driving signal; the first latch circuit is preferably configured to hold the digital signal from the third wirings on a j column basis in response to pulse signals from n/j columns output from the shift register; the second latch circuit is preferably configured to hold the digital signal held in the first latch circuit in accordance with a latch signal; the D/A converter circuit is preferably configured to generate an analog video signal in accordance with the digital signal held in the second latch circuit; the switching circuit is preferably configured to switch between transmission of the video signal to the buffer circuit and transmission of the driving signal to the buffer circuit; the buffer circuit is preferably configured to output the amplified video signal or the amplified driving signal to the first wiring; and the driving signal from any one of the third wirings is preferably transmitted to the first wiring on a j column basis.

In the semiconductor device of one embodiment of the present invention, the second circuit preferably includes a shift register, a first latch circuit, a second latch circuit, a D/A converter circuit, a switching circuit, and a buffer circuit; the first wiring preferably includes n wirings (n is a natural number of 2 or more); the first latch circuit is preferably electrically connected to a third wiring; the third wiring is preferably configured to transmit a digital signal which is the video signal; the first latch circuit is preferably configured to hold the digital signal from the third wiring in accordance with a pulse signal output from the shift register; the second latch circuit is preferably electrically connected to h fourth wirings (h is a natural number of 2 or more); the fourth wirings are preferably configured to transmit a latch signal for enabling holding of the digital signal held in the first latch circuit and the driving signal; the D/A converter circuit is preferably configured to generate an analog video signal in accordance with the digital signal output from the second latch circuit; the buffer circuit is preferably configured to output the amplified video signal or the amplified driving signal to the first wiring; and the driving signal from any one of the fourth wirings is preferably transmitted to the first wiring on a n/h column basis.

In the semiconductor device of one embodiment of the present invention, the pixel preferably includes a liquid crystal element and the second wiring is preferably electrically connected to a common electrode.

In the semiconductor device of one embodiment of the present invention, the first circuit and the second circuit are preferably provided in one integrated circuit.

In the semiconductor device of one embodiment of the present invention, the pixel preferably includes a transistor and the first wiring and the second wiring are preferably provided on a transistor side of a substrate.

Note that other embodiments of the present invention will be shown in the following embodiments and the drawings.

One embodiment of the present invention can provide a novel semiconductor device or the like.

One embodiment of the present invention can provide a semiconductor device or the like having a novel structure that enables reduced frame width or reduced cost.

DETAILED DESCRIPTION OF THE INVENTION

Figure 1:
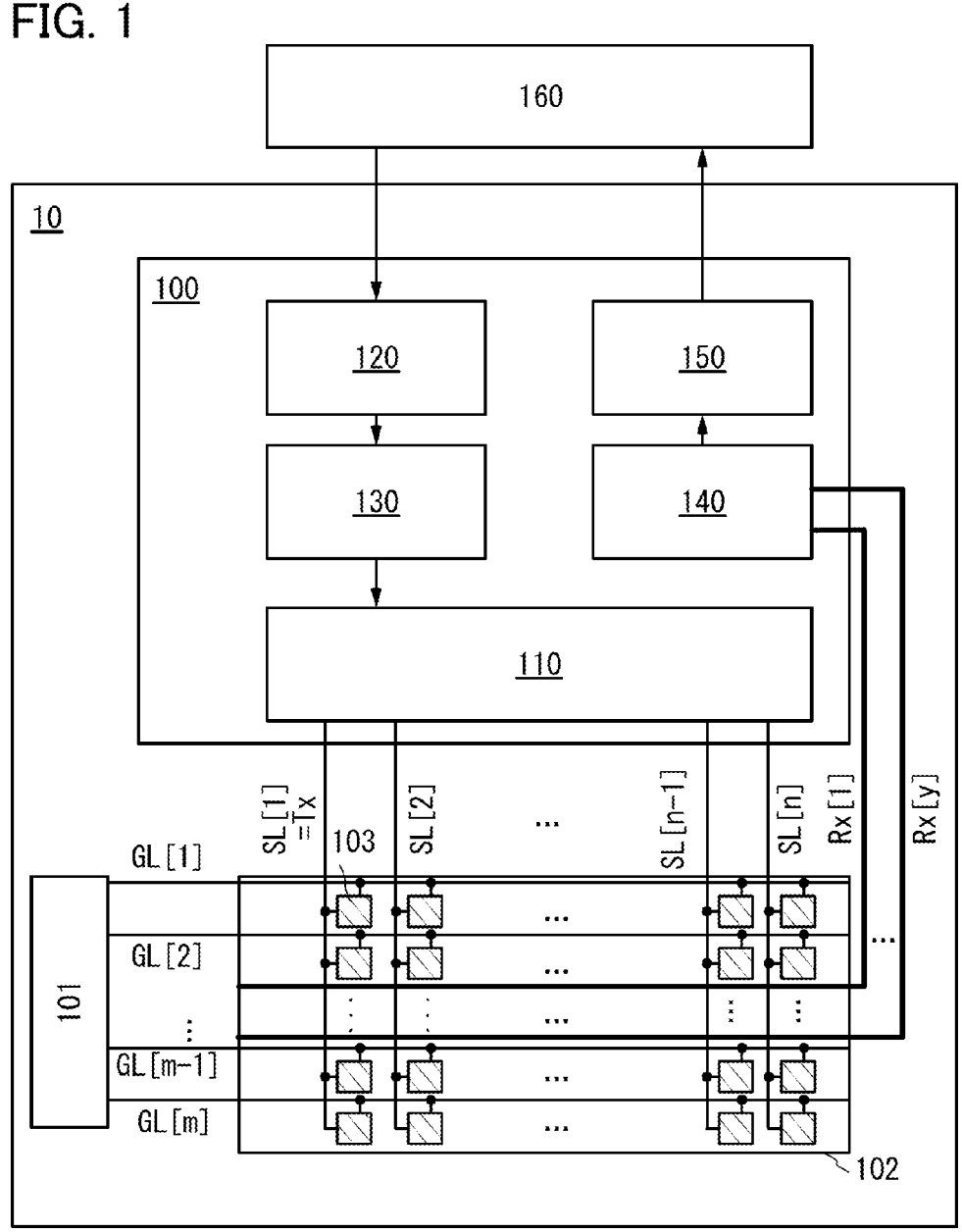
FIG. 1 is a block diagram illustrating one embodiment of the present invention.

Embodiments will be described in detail with reference to drawings. Note that the present invention is not limited to the following description, and it is easily understood by those skilled in the art that various changes and modifications can be made without departing from the spirit and scope of the present invention. Accordingly, the present invention should not be interpreted as being limited to the description of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not denoted by reference numerals in some cases.

Note that in each drawing described in this specification, the size, the layer thickness, or the region of each component is exaggerated for clarity in some cases. Therefore, embodiments of the present invention are not limited to such scales.

Note that in this specification and the like, ordinal numbers such as "first", "second", and the like are used in order to avoid confusion among components and do not limit the number.

Note that the terms "film" and "layer" can be interchanged with each other in some cases. For example, in some cases, the term "conductive film" can be used instead of the term "conductive layer," and the term "insulating layer" can be used instead of the term "insulating film."

Embodiment 1

In this embodiment, an example of a semiconductor device including an integrated circuit having a function of a driver circuit of a display portion and a function of a driver circuit of a touch sensor will be described. In this embodiment, a semiconductor device includes a display portion that is controlled with the use of a wiring electrically connected to the semiconductor device. A semiconductor device including a display portion may be referred to as a touch panel.

In this specification and the like, a semiconductor device generally refers to a device that can function by utilizing semiconductor characteristics. An integrated circuit or the like composed of semiconductor elements such as transistors is a semiconductor device.

In this specification and the like, a touch panel refers to a display device (or a display module) provided with a touch sensor. In some cases, a touch panel is called a touch screen. Furthermore, a device which does not include a display device and includes only a touch sensor is called a touch panel in some cases. A display device that is provided with a touch sensor is also called a touch sensor equipped display device, a display device equipped touch panel, a display module, or the like in some cases.

A display device in which an electrode of a touch sensor is incorporated on the element substrate side is called a full in-cell touch panel (or a full in-cell touch sensor equipped display device), in some cases. In the full in-cell touch panel, for example, an electrode formed on the element substrate side is also used as an electrode for the touch sensor.

A display device in which an electrode of a touch sensor is incorporated on the counter substrate side as well as on the element substrate side is called a hybrid in-cell touch panel (or a hybrid in-cell touch sensor equipped display device). The hybrid in-cell touch panel uses an electrode formed on the element substrate side and an electrode formed on the counter substrate side as electrodes for a touch sensor, for example.

A display device in which an electrode of a touch sensor is incorporated on the counter substrate side is called an on-cell touch panel (or an on-cell touch sensor equipped display device), in some cases. The on-cell touch panel uses an electrode formed on the counter substrate side also as an electrode for a touch sensor, for example.

Structure of Semiconductor Device

A structure of a semiconductor device which includes an integrated circuit having a function of a driver circuit of a display portion and a function of a driver circuit of a touch sensor is described below. The driver circuit of the display portion included in the integrated circuit functions as a source driver.

FIG. 1 is a block diagram of a semiconductor device 10. The semiconductor device 10 includes an integrated circuit 100, a gate driver 101, and a display/sensor portion 102.

The display/sensor portion 102 includes pixels 103 arranged in a matrix. Each of the pixels 103 is connected to any one of source lines SL[1] to SL[n] (n is a natural number of 2 or more) and any one of gate lines GL[1] to GL[m] (m is a natural number of 2 or more).

The source lines SL[1] to SL[n] have a function of transmitting video signals to the pixels 103. The video signals are also referred to as image signals or data signals. In addition, the source lines are also referred to as signal lines or data lines.

The gate lines GL[1] to GL[m] have a function of transmitting gate signals to the pixels 103. The gate signals are also referred to as scan signals or selection signals. In addition, the gate lines are also referred to as scan lines, selection lines, or simply wirings.

The display/sensor portion 102 includes wirings Rx[1] to Rx[y] (y is a natural number of 2 or more) functioning as sensing electrodes of the touch sensor. The source lines SL[1] to SL[n] have wirings Tx[1] to Tx[x] (x is a natural number of 2 or more) functioning as driving electrodes of the touch sensor. That is, the source lines SL[1] to SL[n] are wirings having both a function of transmitting video signals to the pixels and a function of driving electrodes of the touch sensor.

Note that as an example of the method for sensing the touch between the wirings Rx[1] to Rx[y] and the wiring Tx[1] to Tx[x], mutual capacitive sensing can be employed, in which sensing of the touch is performed by inputting driving signals from the driving electrode side and reading a change in capacitance between the driving electrodes and the sensing electrodes on the sensing electrode side.

The pixels 103 include a transistor and a display element such as a liquid crystal element or a light-emitting element. The pixels that can be employed as the pixels 103 are described later in Embodiment 2.

The gate driver 101 has a function of sequentially supplying gate signals to the gate lines GL[1] to GL[m]. A shift register, a buffer circuit, and the like can constitute the gate driver 101.

The integrated circuit 100 has a function of sequentially supplying video signals to the source lines SL[1] to SL[n] to make the display/sensor portion 102 perform display. Furthermore, the integrated circuit 100 has a function of sequentially supplying driving signals to the source lines SL[1] to SL[n] to sense the touch in the display/sensor portion 102.

The integrated circuit 100 includes a signal output circuit 110, an input portion 120, a controller 130, a signal sensing circuit 140, and a signal transmitting circuit 150. The integrated circuit 100 can switch between an operation for performing display by transmitting or receiving a signal to/from a host 160 provided outside the semiconductor device 10 and an operation for sensing the touch.

The input portion 120 receives data for performing display or a signal for switching between the display mode and the touch sensing mode from the host 160. Various signals received from the host 160 can be input to the semiconductor device 10 by any of various methods such as digital visual interface (DVI), low voltage differential signaling (LVDS), and reduced swing differential signaling (RSDS). In the case where a signal is input by LVDS, for example, the input portion 120 may be provided with a comparator or the like to convert a signal of a differential pair into a single-ended signal.

The controller 130 has a function of converting a serial signal obtained from the input portion 120 into a parallel signal. This parallel signal is output to the signal output circuit 110 as a digital video signal. The controller 130 has a function of outputting a driving signal for touch sensing to the signal output circuit 110 in accordance with the signal received by the input portion 120. Furthermore, the controller 130 generates various signals for driving the signal output circuit 110, e.g., a start pulse, a clock signal, a latch signal, and a switching signal, in accordance with the signal received by the input portion 120 and outputs them to the signal output circuit 110.

The signal sensing circuit 140 is connected to the wirings Rx[1] to Rx[y] having a function of sensing electrodes of the touch sensor and has a function of sensing a change in capacitance between wirings connected to the driving electrodes and wirings connected to the sensing electrodes. The data on the touched position or the like, which varies depending on whether the touch is performed, can be transmitted to the host 160 through the signal transmitting circuit 150. For example, the signal sensing circuit 140 includes, from the sensing electrode side, a circuit that receives an analog signal and converts it into a digital signal, a circuit that performs signal processing such as noise elimination from the obtained digital signal, sensing of a touch position, and tracking of the touch position, and the like.

The signal output circuit 110 performs a function of outputting a video signal for performing display and a function of outputting a driving signal for sensing a change in capacitance; the function is switched therebetween by the controller 130.

Function of Signal Output Circuit

Next, functions of the signal output circuit 110 is described with reference to FIGS. 2A to 2C.

Figure 2A:
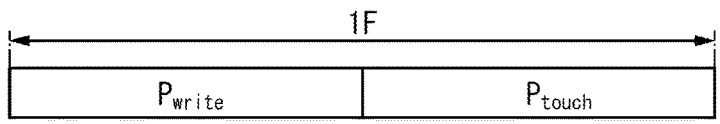
FIGS. 2A to 2C are a timing chart and circuit diagrams showing one embodiment of the present invention.

FIG. 2A is a timing chart showing one frame period (1F). One frame period consists of a period when display is performed (hereinafter referred to as a display period ($P_{write}$)) and a period when sensing of a change in capacitance, i.e., touch sensing, is performed (hereinafter referred to as a touch sensing period ($P_{touch}$)).

Figure 2B:
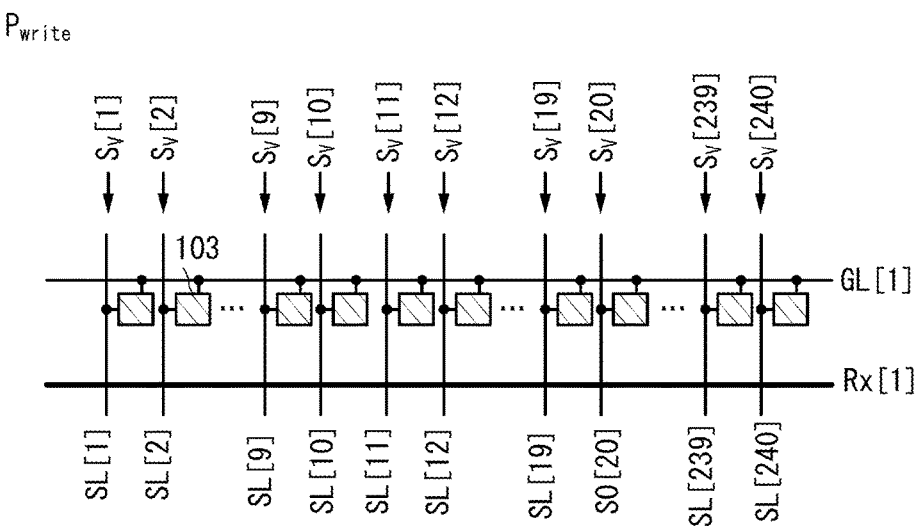

FIG. 2B is a schematic circuit diagram showing signals that are transmitted to the source lines SL[1] to SL[240] in the display period ($P_{write}$). In FIG. 2B, the number of source lines SL is 240 for simplicity. FIG. 2B shows the pixels 103 connected to the gate line GL[1] in the first row and the wiring Rx[1] functioning as the sensing electrode. In the display period, the signal output circuit 110 can transmit video signals $S_V[1]$ to $S_V[240]$ to the source lines SL[1] to SL[240] as shown in FIG. 2B.

Figure 2C:
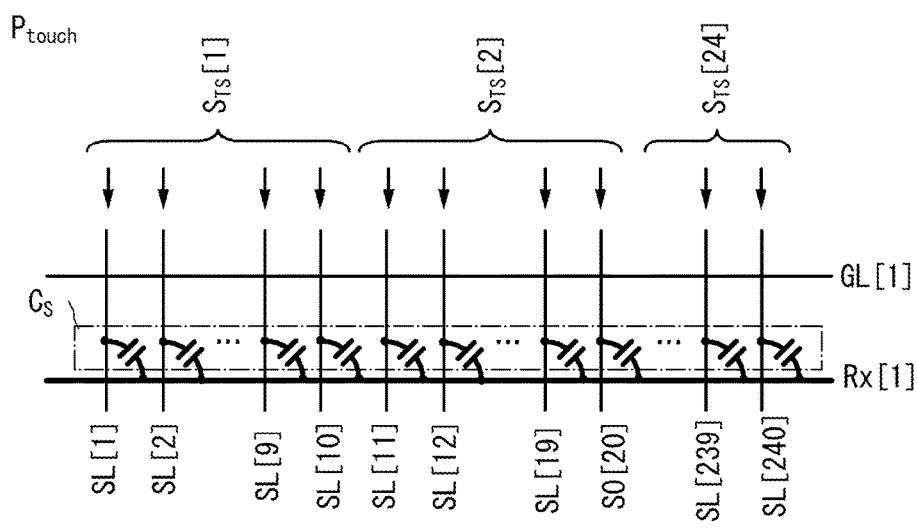

FIG. 2C is a schematic circuit diagram showing signals that are transmitted to the source lines SL[1] to SL[240] in the touch sensing period ($P_{touch}$). In FIG. 2C, in a manner similar to that of FIG. 2B, the number of source lines SL is 240 for simplicity. FIG. 2C shows the pixels 103 connected to the gate line GL[1] in the first row and the wiring Rx[1] functioning as the sensing electrode. In the touch sensing period, the signal output circuit 110 can transmit driving signals $S_{TS}[1]$ to $S_{TS}[24]$ to the source lines SL[1] to SL[240], one driving signal $S_{TS}$ to a certain number (here, ten) of corresponding source lines SL, as shown in FIG. 2C. Note that capacitance $C_s$ is formed between the source lines SL[1] to SL[240] and the wiring Rx[1] and can be used for touch sensing of an object.

As shown in FIG. 2C, a plurality of wirings, the source lines SL[1] to SL[10] and the source lines SL[11] to SL[20] here, are assigned to correspond to the driving signal $S_{TS}[1]$ and the driving signal $S_{TS}[2]$. Although the number of source lines is large, the capacitance between one source line and the wiring Rx functioning as a sensing electrode is small. Thus, a plurality of source lines are assigned as the wirings Tx[1] and Tx[2] functioning as driving electrodes and the same driving signal is applied thereto to increase the capacitance, which facilitates touch sensing.

The signal output circuit 110 can switch the output between the video signals $S_V[1]$ to $S_V[240]$ and the driving signals $S_{TS}[1]$ to $S_{TS}[24]$, which are shown in FIGS. 2B and 2C, by changing the signal supplied from the controller 130. Since a video signal and a driving signal can be output to a source line using the same circuit, a source driver for performing display and a driver circuit for driving a touch sensor can be combined in one circuit. One circuit having various functions leads to miniaturization of the circuit and consequently enables reduced frame width or reduced cost.

Specific Example 1 of Signal Output Circuit

Figure 3:
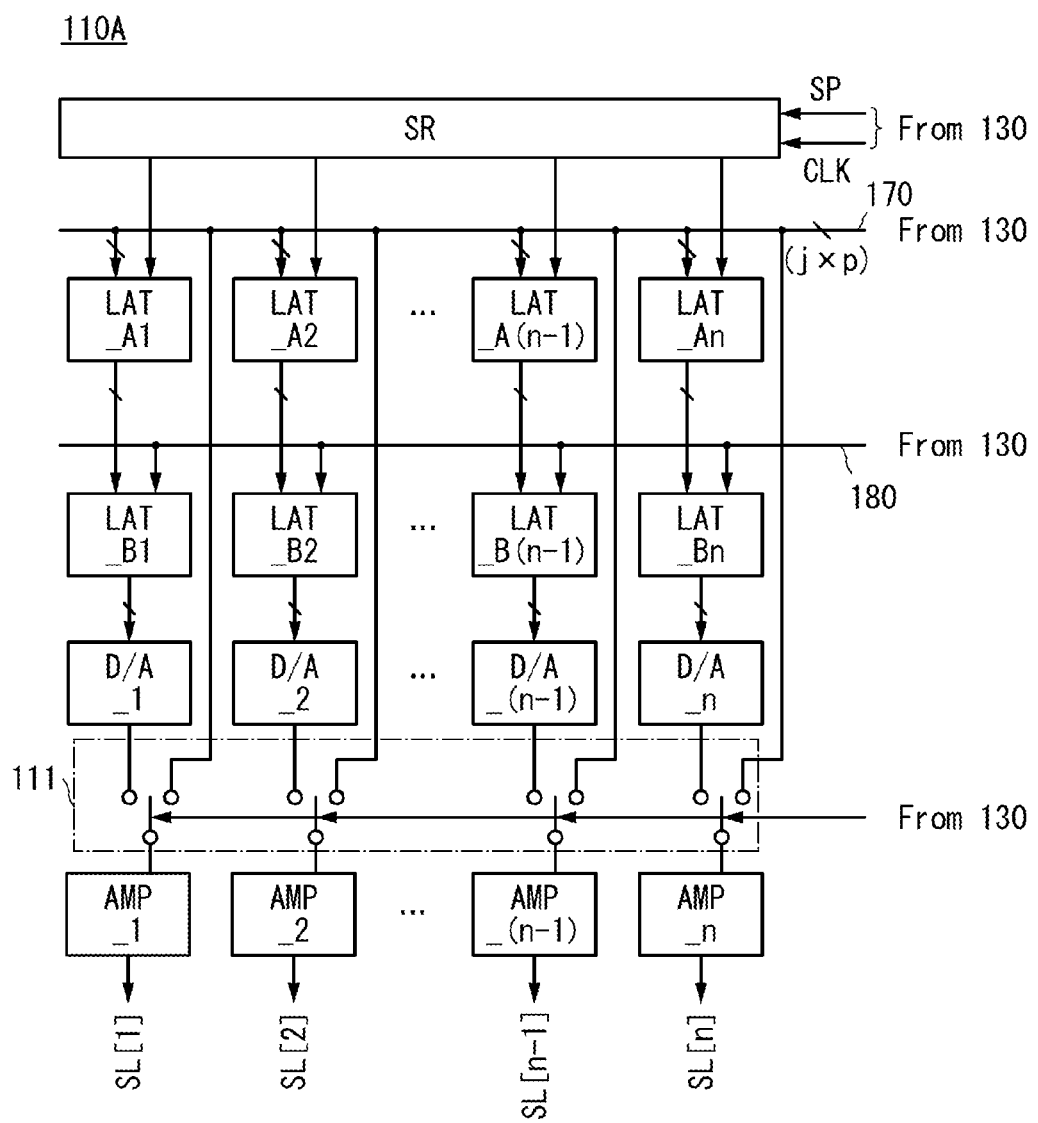
FIG. 3 is a block diagram illustrating one embodiment of the present invention.

Next, an example of a specific circuit configuration of the above-described signal output circuit 110 is illustrated in FIG. 3. A signal output circuit 110A illustrated in FIG. 3 includes a shift register SR, latch circuits LAT_A1 to LAT_An, latch circuits LAT_B1 to LAT_Bn, D/A (digital/analog) converter circuits D/A_1 to D/A_n, a switching circuit 111, and buffer circuits AMP_1 to AMP_n.

The shift register SR generates a pulse signal in accordance with a start pulse SP, a clock signal CLK, and the like output from the controller 130. The shift register SR includes cascaded pulse output circuits formed of flip-flops and can sequentially output pulse signals.

The latch circuits LAT_A1 to LAT_An have a function of holding a digital video signal (also referred to as $D_V$) supplied to a wiring 170, in response to a pulse signal output from the shift register SR. The video signal $D_V$ is supplied from the controller 130.

The number of latch circuits LAT_A1 to LAT_An can correspond to the number of columns of the source lines SL[1] to SL[n] and is n. Thus, n latch circuits LAT_A1 to LAT_An are provided. The number of wirings 170 varies depending on the number of bits of the video signal $D_V$ input in parallel and the number of latch circuits selected at the same time by a pulse signal.

For example, the video signal $D_V$ input in parallel is a p-bit (p is a natural number of 2 or more) digital video signal and the latch circuits LAT_A in j columns are selected at the same time by a pulse signal. In this case, the number of wirings 170 is j×p. Note that the shift register SR outputs n/j pulse signals. The number of columns to which pulse signals are output from the shift register SR can be smaller than the number of columns of source lines, which enables a structure in which the number of columns of source lines is increased for a high-definition display portion or a reduction in the frequency of the clock signal CLK.

As described above, the wirings 170 transmit the video signal $D_v$ in a display period. In contrast, in a touch sensing period, the wirings 170 transmit the driving signals $S_{TS}[1]$ to $S_{TS}[j×p]$. The wirings 170 are also connected to the switching circuit 111 as well as the latch circuits LAT_A1 to LAT_An.

The latch circuits LAT_B1 to LAT_Bn have a function of holding $D_v$ held in each of the columns of the latch circuits LAT_A1 to LAT_An, in accordance with a latch signal supplied to a wiring 180. The latch signal is output from the controller 130. The number of latch circuits LAT_B1 to LAT_Bn can be n, in a manner similar to that of the latch circuits LAT_A1 to LAT_An. The number of wirings 180 may be one or more depending on the number of latch signals.

The D/A converter circuits D/A_1 to D/A_n have a function of converting the digital video signal $D_v$, which is held in the latch circuits LAT_B1 to LAT_Bn, into analog video signals $S_V[1]$ to $S_V[n]$ and outputting the analog video signals. The D/A converter circuits D/A_1 to D/A_n are connected to the switching circuit 111.

The switching circuit 111 can switch signals supplied to the buffer circuits AMP_1 to AMP_n between the video signals $S_V[1]$ to $S_V[n]$ output from the D/A converter circuits D/A_1 to D/A_n and the driving signals $S_{TS}[1]$ to $S_{TS}[j×p]$ supplied through the wiring 170, in accordance with a switching signal output from the controller 130.

The buffer circuits AMP_1 to AMP_n have a function of amplifying the video signals $S_V[1]$ to $S_V[n]$ or the driving signals $S_{TS}[1]$ to $S_{TS}[j×p]$ and outputting them to the source lines SW[1] to SL[n].

Figure 4:
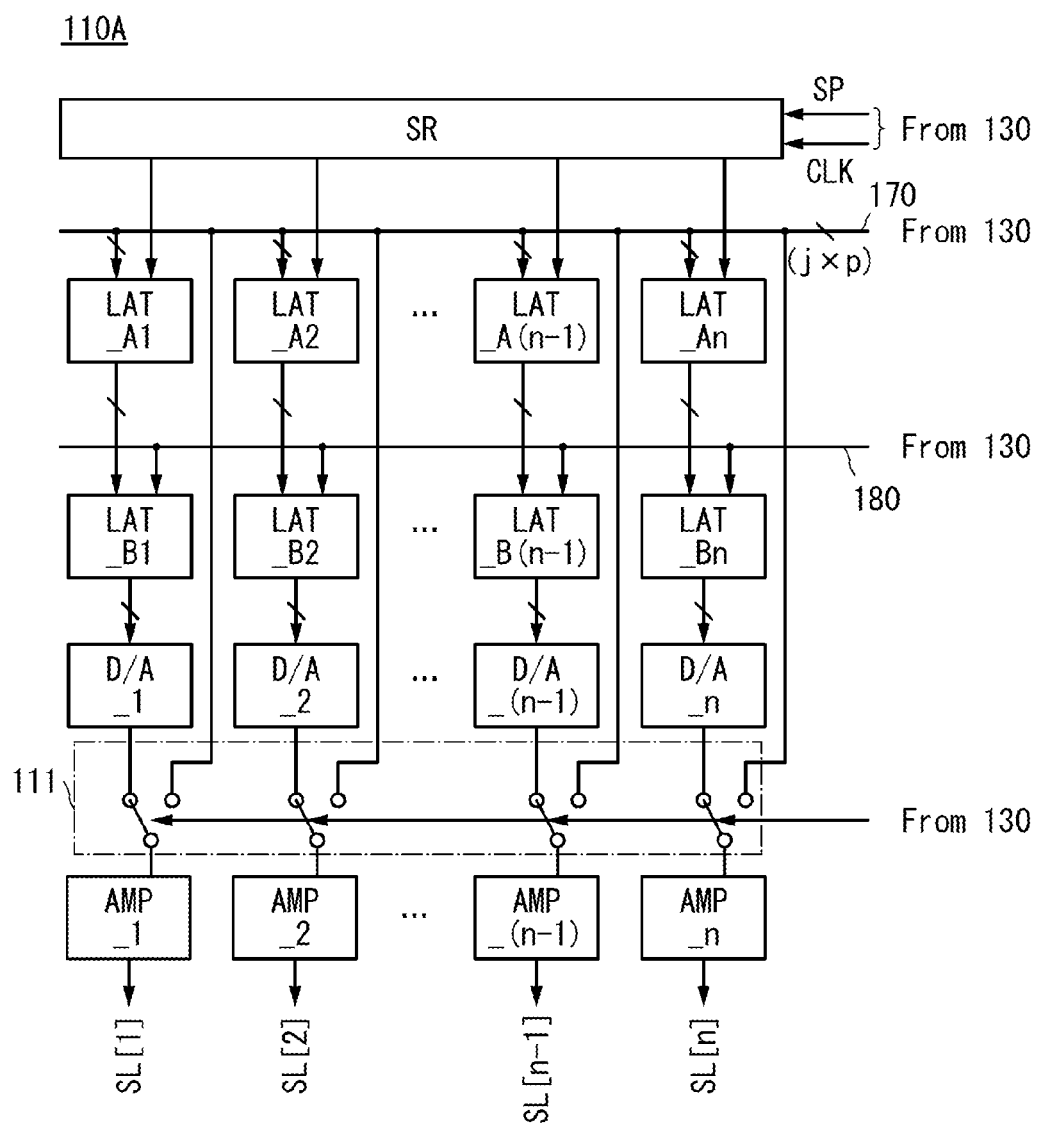
FIG. 4 is a block diagram illustrating one embodiment of the present invention.
Figure 5:
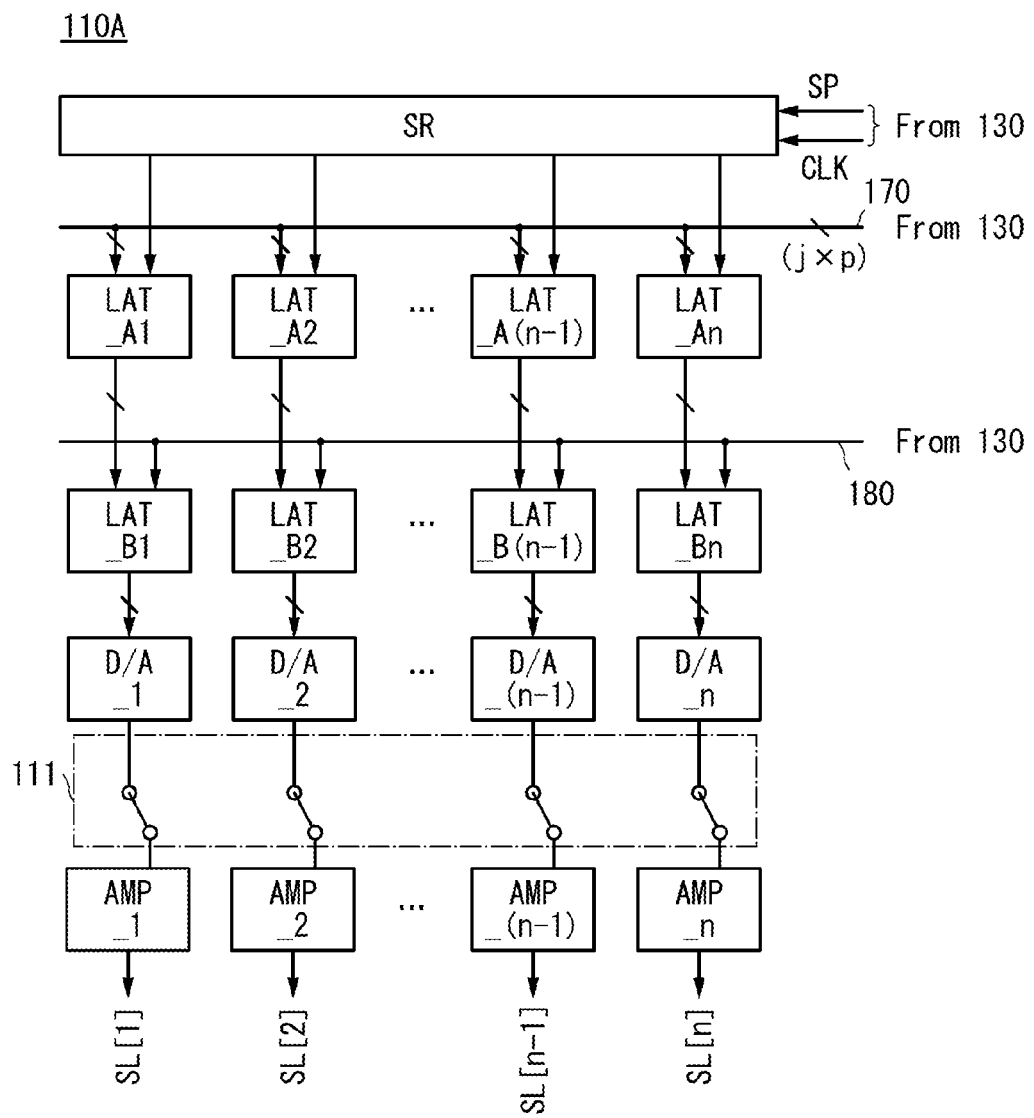
FIG. 5 is a block diagram illustrating one embodiment of the present invention.

The signal output circuit 110A illustrated in FIG. 3 switches the connection using the switching circuit 111 so that the D/A converter circuits D/A_1 to D/A_n are connected to the buffer circuits AMP_1 to AMP_n in a display period. That is, the switching circuit 111 switches the connection as illustrated in FIG. 4, and the signal output circuit 110A can have a circuit configuration illustrated in FIG. 5. With this circuit configuration, the signal output circuit 110A can sequentially output the video signals $S_V[1]$ to $S_V[n]$ to corresponding columns of the source lines SL[1] to SL[n] in the display period.

Figure 6:
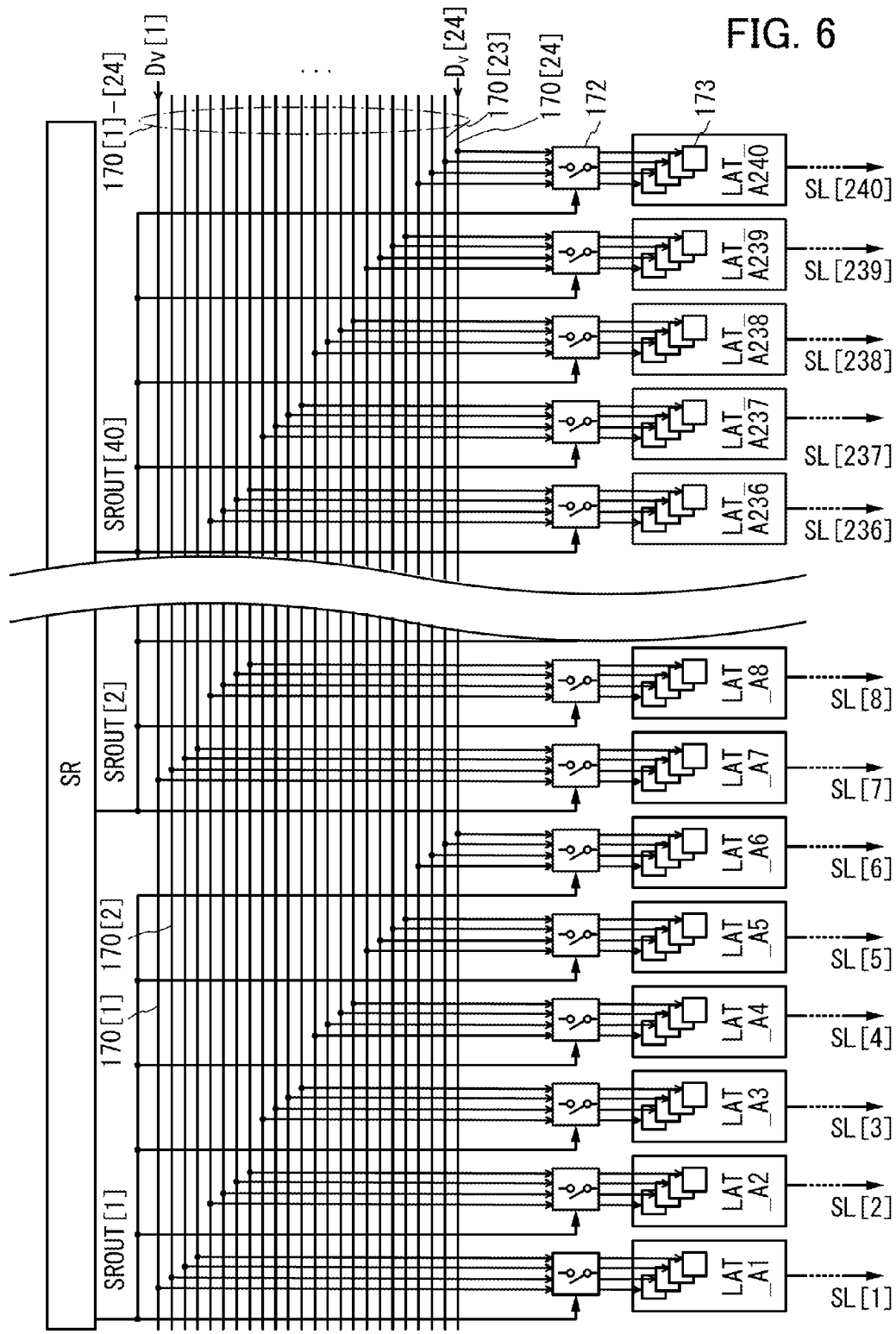
FIG. 6 is a block diagram illustrating one embodiment of the present invention.

FIG. 6 illustrates a specific structure of the (j×p) wirings 170. In the example in FIG. 6, the p-bit video signal $D_V$ is 4-bit and six switches 172 are selected at the same time by a pulse signal output from the shift register SR. That is, the number of wirings 170 is 24 (i.e., the wirings 170[1] to 170[24] are provided), and digital video signals $D_V[1]$ to $D_V[24]$ are supplied to the wirings 170[1] to 170[24]. Switches 172 are connected to the wirings 170[1] to 170[24]. The switches 172 make the video signals $D_V[1]$ to $D_V[24]$ be stored in 1-bit memory circuits 173 included in the latch circuits LAT_A1 to LAT_A240 in accordance with pulse signals output from the shift register SR.

In FIG. 6, 240 columns of source lines, that is, the source lines SL[1] to SL[240] are illustrated. In this case, the shift register SR outputs pulse signals to 40 columns; thus, pulse signals SROUT[1] to SROUT[40] are shown in the drawing.

In the signal output circuit 110A illustrated in FIG. 6, the video signals $D_V[1]$ to $D_V[24]$ are stored in the latch circuits LAT_A1 to LAT_A6 at the same time by the pulse signal SROUT[1]. Then, the video signals $D_V$ are stored in the latch circuits LAT_A7 to LAT_A12 by the pulse signal SROUT[2] obtained by shifting the pulse signal SROUT[1]. In this way, the video signals $D_V$ are stored in the predetermined latch circuits, and through the latch circuits, the D/A converter circuits, and the buffer circuits, the video signals $S_V$ can be supplied to the source lines SL[1] to SL[240].

Figure 7:
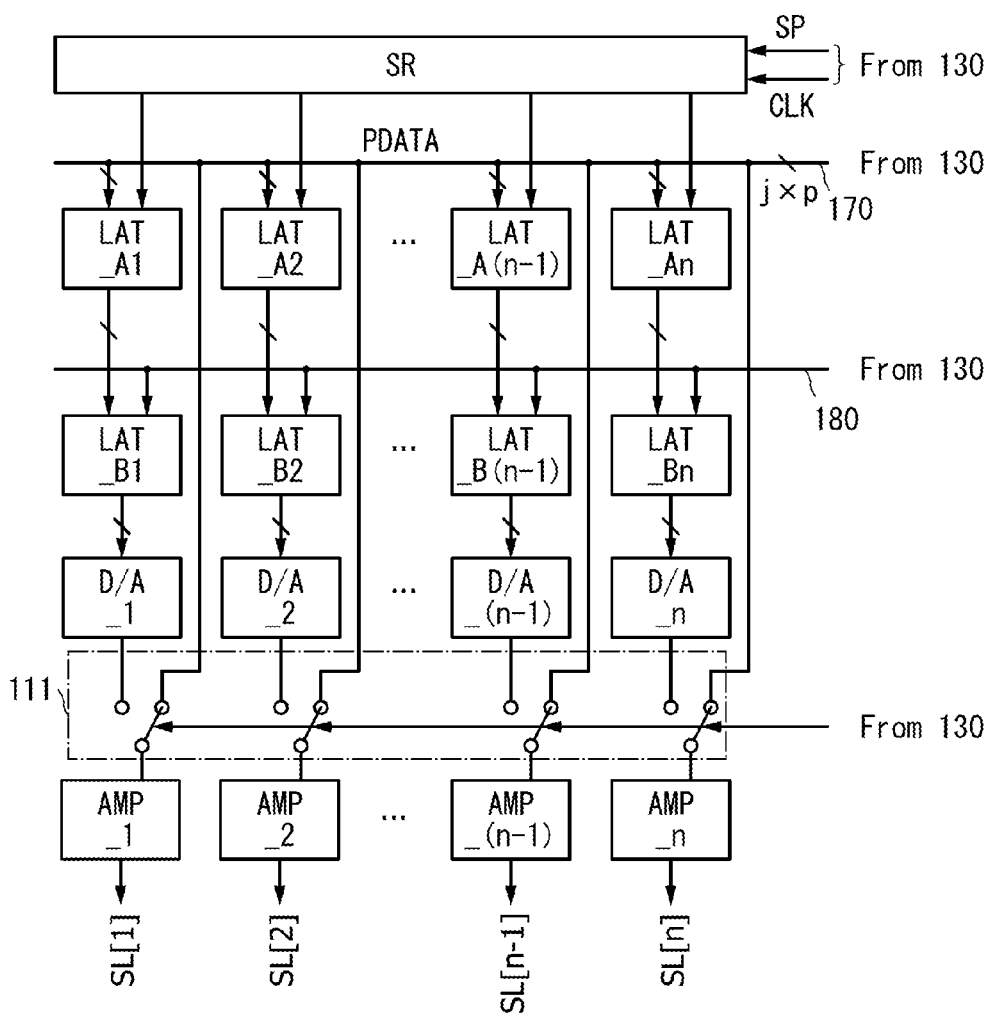
FIG. 7 is a block diagram illustrating one embodiment of the present invention.
Figure 8:
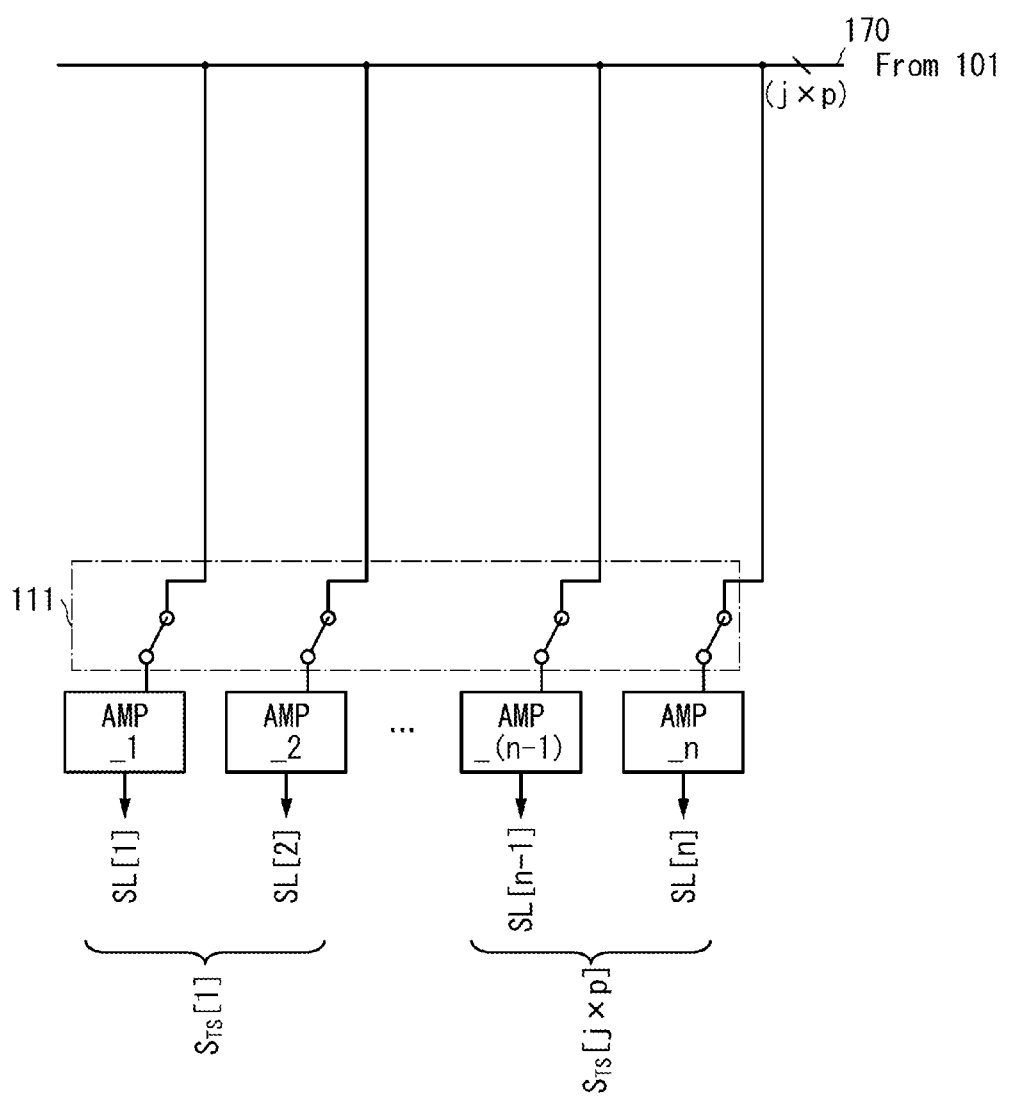
FIG. 8 is a block diagram illustrating one embodiment of the present invention.

Furthermore, the signal output circuit 110A illustrated in FIG. 3 switches the connection using the switching circuit 111 so that the wiring 170 is connected to the buffer circuits AMP_1 to AMP_n in a touch sensing period. That is, the switching circuit 111 switches the connection as illustrated in FIG. 7, and the signal output circuit 110A can have a circuit configuration illustrated in FIG. 8. With this circuit configuration, the signal output circuit 110A can sequentially output the driving signals $S_{TS}[1]$ to $S_{TS}[j \times p]$ to corresponding columns of the source lines SL[1] to SL[n] in the touch sensing period.

Figure 9:
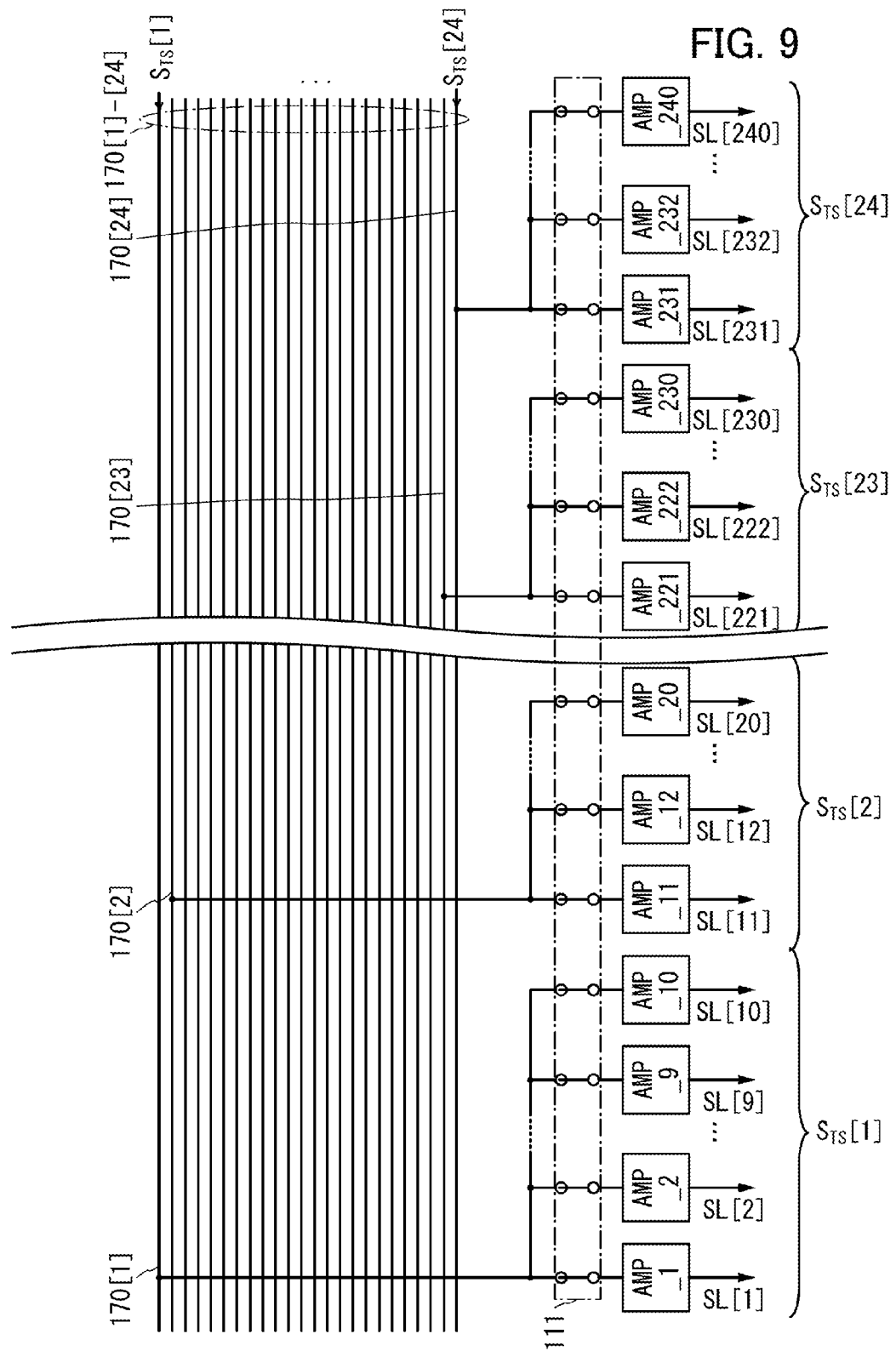
FIG. 9 is a block diagram illustrating one embodiment of the present invention.

In a manner similar to that of FIG. 6, FIG. 9 illustrates a specific structure of the (j×p) wirings 170. The number of wirings 170 is 24 (i.e., the wirings 170[1] to 170[24] are provided) in FIG. 9, and the driving signals $S_{TS}[1]$ to $S_{TS}[24]$ are supplied to the wirings 170[1] to 170[24].

The wirings 170[1] to 170[24] are connected to the switching circuit 111. For example, the wiring 170[1] is connected to the buffer circuits AMP_1 to AMP_10 through the switching circuit 111, and the driving signal $S_{TS}[1]$ supplied to the wiring 170[1] can be supplied to each column of the source lines SL[1] to SL[10].

Similarly, the wiring 170[2] is connected to the buffer circuits AMP_11 to AMP 20 through the switching circuit 111, and the driving signal $S_{TS}[2]$ supplied to the wiring 170[2] can be supplied to each column of the source lines SL[11] to SL[20]. Furthermore, the wiring 170[24] is connected to the buffer circuits AMP_231 to AMP_240 through the switching circuit 111. The driving signal $S_{TS}[24]$ supplied to the wiring 170[24] can be supplied to each column of the source lines SL[231] to SL[240].

As described above, the signal output circuit 110A can switch the output between the video signals $S_V[1]$ to $S_V[240]$ and the driving signals $S_{TS}[1]$ to $S_{TS}[24]$ by changing the signal supplied from the controller 130. Since a video signal and a driving signal can be output to a source line using the same circuit, a source driver for performing display and a driver circuit for driving a touch sensor can be combined in one circuit. One circuit having various functions leads to miniaturization of the circuit and consequently enables reduced frame width or reduced cost.

Specific Example 2 of Signal Output Circuit

Figure 10:
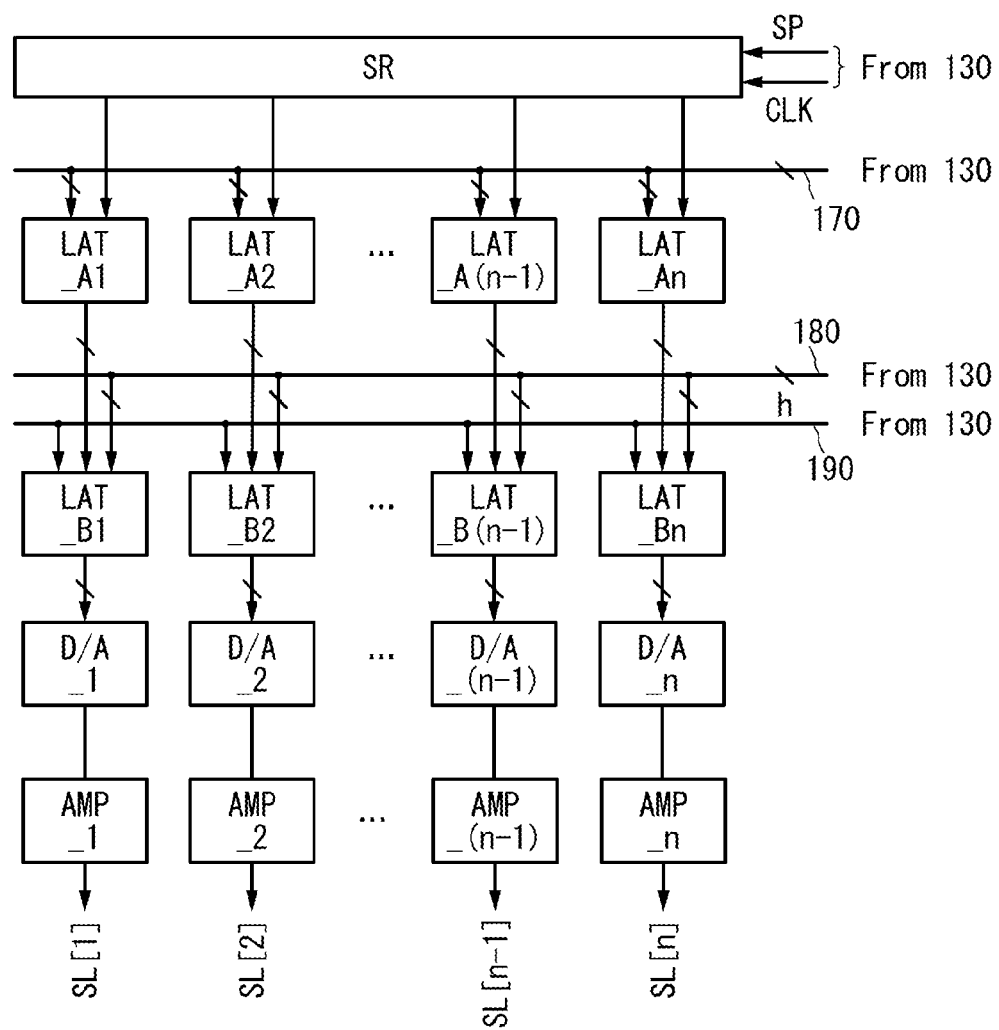
FIG. 10 is a block diagram illustrating one embodiment of the present invention.

Next, a signal output circuit 110B, which is a specific example different from the signal output circuit 110A, is illustrated in FIG. 10. The signal output circuit 110B includes the shift register SR, the latch circuits LAT_A1 to LAT_An, the latch circuits LAT_B1 to LAT_Bn, the D/A (digital/analog) converter circuits D/A_1 to D/A_n, and the buffer circuits AMP_1 to AMP_n. Differences from the signal output circuit 110A and the operation of the signal output circuit 110B are described in detail below.

The latch circuits LAT_A1 to LAT_An have a function of holding a digital video signal (also referred to as $D_V$) supplied to the wiring 170, in response to a pulse signal output from the shift register SR. The video signal $D_V$ is supplied from the controller 130. The number of wirings can be determined as appropriate in accordance with the number of bits of the video signal $D_V$ and the number of pulse signals output from the shift register SR.

As described above, the wirings 170 transmit the video signal $D_V$ in a display period. In contrast, in a touch sensing period, the wirings 170 transmit a signal $D_{TS}$, which is different from the video signal $D_V$. This signal $D_{TS}$ is, for example, a video signal $D_V$ for outputting a video signal of the same grayscale level to each column of source lines.

The latch circuits LAT_B1 to LAT_Bn have a function of holding the signal $D_V$ held in each of the columns of the latch circuits LAT_A1 to LAT_An, in accordance with a latch signal supplied from the controller 130 to the wiring 180. Furthermore, the latch circuits LAT_B1 to LAT_Bn have a function of sequentially holding $D_V$ held in each of the columns of the latch circuits LAT_A1 to LAT_An, in accordance with a driving signal supplied from the controller 130 to the wiring 180. Moreover, the latch circuits LAT_B1 to LAT_Bn have a function of initializing $D_V$ held in each of the columns of the latch circuits LAT_B1 to LAT_Bn, in accordance with a control signal supplied from the controller 130 to a wiring 190.

The wiring 180 includes h wirings. The number of wirings included in the wiring 180 may be h when the number of driving signals supplied to a group of columns of the source lines SL[1] to SL[n] is h. The driving signals $S_{TS}[1]$ to $S_{TS}[h]$ are supplied to h wirings included in the wiring 180 and then supplied to the source lines SL[1] to SL [n] through the D/A converter circuits D/A_1 to D/A_n and the buffer circuits AMP_1 to AMP_n.

The D/A converter circuits D/A_1 to D/A_n have a function of converting the digital video signal $D_V$, which is held in the latch circuits LAT_B1 to LAT_Bn, into analog video signals $S_V[1]$ to $S_V[n]$ and outputting the analog video signals. Furthermore, the D/A converter circuits D/A_1 to D/A_n have a function of converting the digital signal $D_{TS}$, which is held in the latch circuits LAT_B1 to LAT_Bn, into the driving signals $S_{TS}[1]$ to $S_{TS}[h]$ and outputting the driving signals. The D/A converter circuits D/A_1 to D/A_n are connected to the switching circuit 111.

The buffer circuits AMP_1 to AMP_n have a function of amplifying the video signals $S_V[1]$ to $S_V[n]$ or the driving signals $S_{TS}[1]$ to $S_{TS}[h]$ and outputting them to the source lines SL[1] to SL[n].

Figure 11:
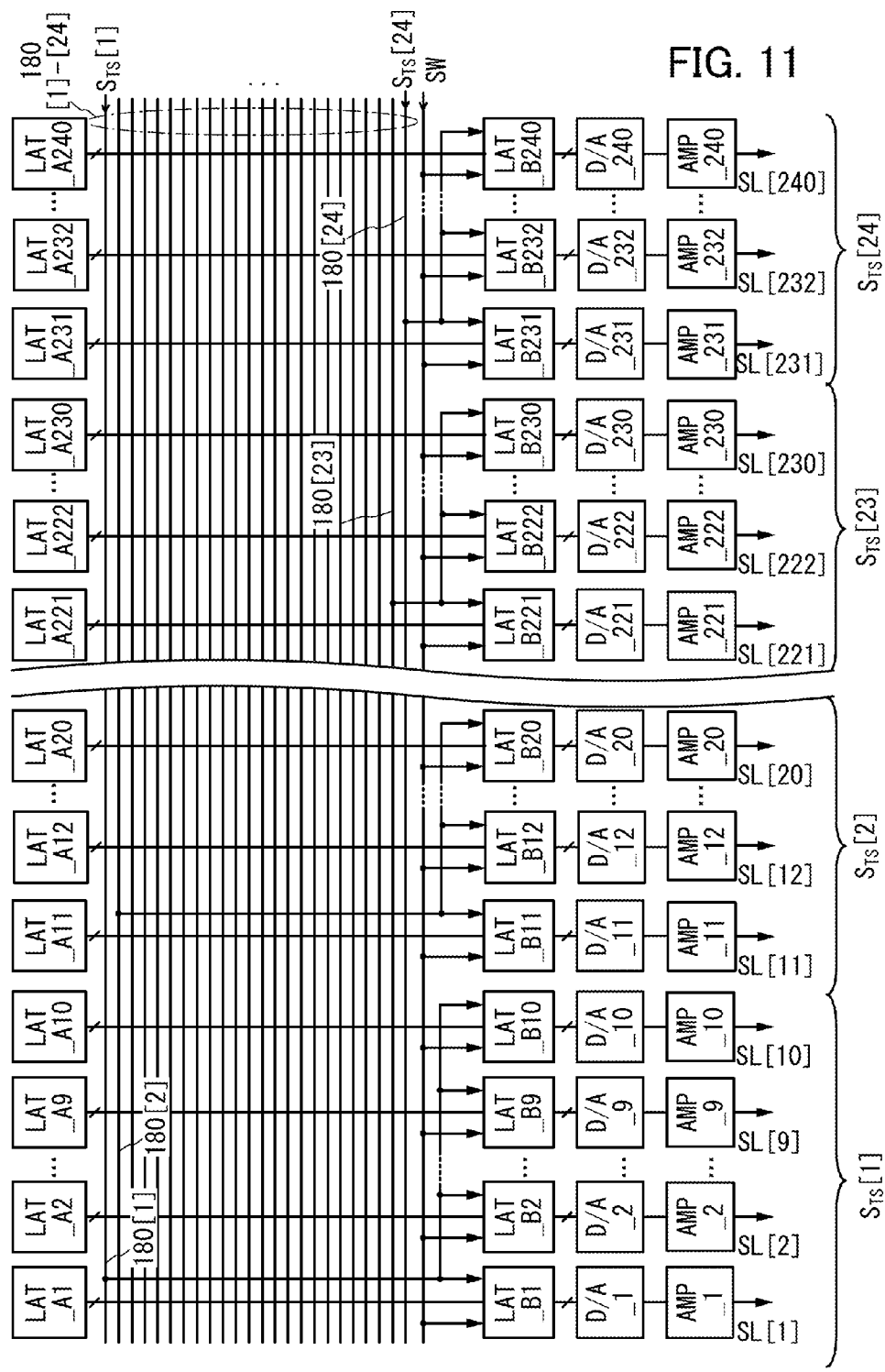
FIG. 11 is a block diagram illustrating one embodiment of the present invention.

The signal output circuit 110B illustrated in FIG. 11 converts the digital video signal $D_V$ into the video signals $S_V[1]$ to $S_V[n]$ in the display period. Furthermore, the signal output circuit 110B illustrated in FIG. 11 performs conversion into the driving signals $S_{TS}[1]$ to $S_{TS}[h]$ that rise at different times on the basis of the driving signals supplied to the wirings 180 and the signals $D_{TS}$ supplied to the wirings 170 in the touch sensing period. Switching between the latch signal and the driving signal supplied to the wirings 180 and switching of the control signal supplied to the wiring 190 are performed on the period basis. With this circuit configuration, the video signals $S_V[1]$ to $S_V[n]$ can be sequentially output to respective columns of the source lines SL[1] to SL[n] in the display period, and the driving signals $S_{TS}[1]$ to $S_{TS}[h]$ can be sequentially output to respective columns of the source lines SL[1] to SL[n] in the touch sensing period.

Figure 12A:
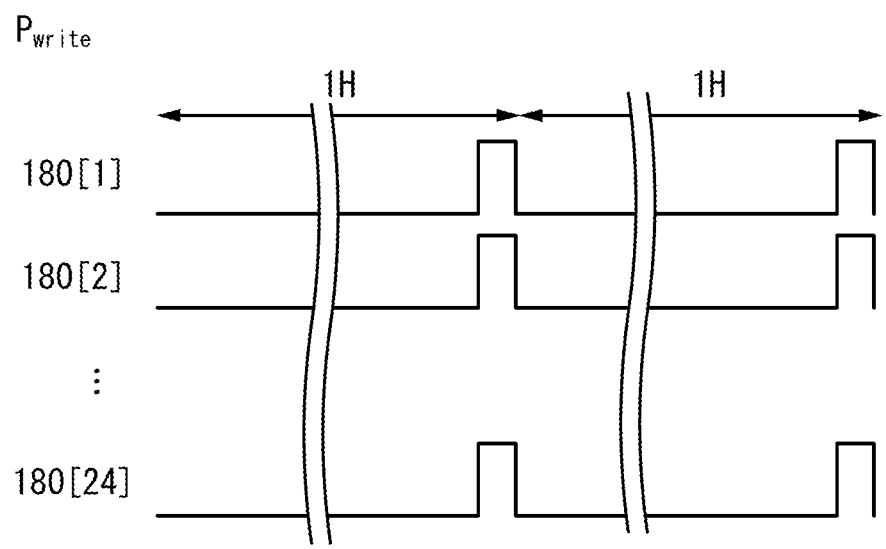
FIGS. 12A and 12B are timing charts showing one embodiment of the present invention.
Figure 12B:
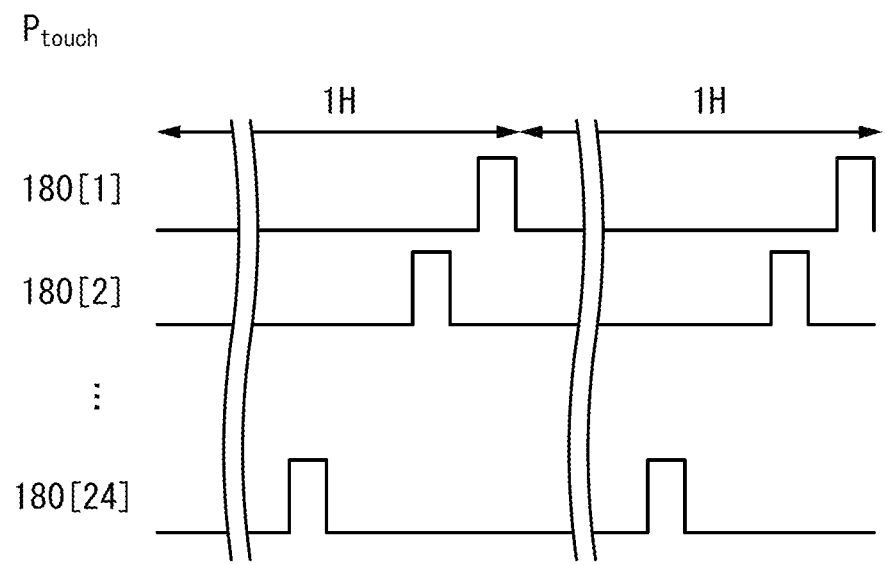

FIGS. 12A and 12B illustrate a specific structure of the h wirings 180. In the example of FIGS. 12A and 12B, the driving signals $S_{TS}[1]$ to $S_{TS}[24]$ and the source lines SL[1] to SL[240] are shown. In this case, the number of wirings 180 is 24 (i.e., the wirings 180[1] to 180[24] are provided) in FIGS. 12A and 12B, and the driving signals $S_{TS}[1]$ to $S_{TS}[24]$ are supplied to the wirings 180[1] to 180[24].

The latch circuits LAT_A1 to LAT_A240 hold the signal $D_{TS}$. By supplying the driving signals $S_{TS}[1]$ to $S_{TS}[24]$ that rise at different times to the wirings 180[1] to 180[24], the driving signal $S_{TS}[1]$ supplied to the wiring 180[1] can be supplied to each column of the source lines SL[1] to SL[10] through the latch circuits LAT_B1 to LAT_B10, the D/A converter circuits D/A_1 to D/A_10, and the buffer circuits AMP_1 to AMP_10.

Similarly, the driving signal $S_{TS}[2]$ supplied to the wiring 180[2] can be supplied to each column of the source lines SL[11] to SL[20] through the latch circuits LAT_B11 to LAT_B20, the D/A converter circuits D/A_11 to D/A_20, and the buffer circuits AMP_11 to AMP_20. Furthermore, the driving signal $S_{TS}[23]$ supplied to the wiring 180[23] can be supplied to each column of the source lines SL[221] to SL[230] through the latch circuits LAT_B221 to LAT_B230, the D/A converter circuits D/A_221 to D/A_230, and the buffer circuits AMP_221 to AMP_230. Moreover, the driving signal $S_{TS}[24]$ supplied to the wiring 180[24] can be supplied to each column of the source lines SL[231] to SL[240] through the latch circuits LAT_B231 to LAT_B240, the D/A converter circuits D/A_231 to D/A_240, and the buffer circuits AMP_231 to AMP_240.

Note that the latch signals supplied through the wirings 180[1] to 180[24] to hold the video signal $D_V$ can be explained with reference to a timing chart shown in FIG. 12A. FIG. 12A shows the waveforms of the signals supplied to the wirings 180[1] to 180[24] in the display period. When one horizontal scanning period is represented by 1H, latch signals for holding of the video signal $D_V$ are supplied in every horizontal scanning period as shown in FIG. 12A.

The driving signals $S_{TS}[1]$ to $S_{TS}[24]$ supplied through the wirings 180[1] to 180[24] to hold the signal $D_{TS}$ at different times can be explained with reference to a timing chart shown in FIG. 12B. FIG. 12B shows the waveforms of the signals supplied to the wirings 180[1] to 180[24] in the touch sensing period. When one horizontal scanning period is represented by 1H, the driving signals $S_{TS}[1]$ to $S_{TS}[24]$ for holding of $D_{TS}$ are sequentially supplied in every horizontal scanning period as shown in FIG. 12B.

Note that the circuit configuration of the latch circuits LAT_B1 to LAT_B240 can be explained with reference to FIGS. 13A to 13C. For example, to a terminal D of the latch circuit LAT_B, a video signal or the like from the latch circuit LAT_A is supplied. To a terminal SW of the latch circuit LAT_B, a control signal or the like from the wiring 190 is supplied. Furthermore, to a terminal LS of the latch circuit LAT_B, a latch signal, a driving signal, or the like from the wiring 180 is supplied. In addition, the latch circuit LAT_B outputs a held signal from a terminal Q to the D/A converter circuit.

Figure 13A:
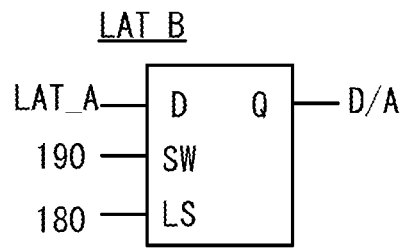
FIGS. 13A to 13C are a circuit diagram and timing charts showing one embodiment of the present invention.
Figure 13B:
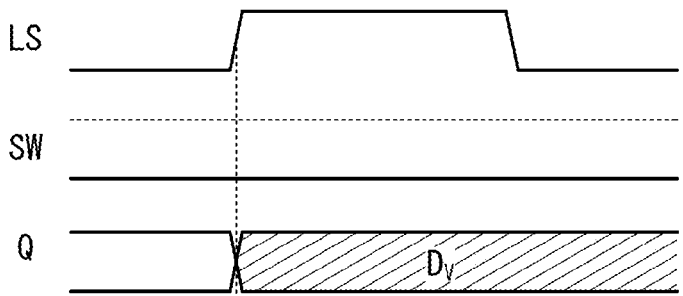

The latch circuit LAT_B illustrated in FIG. 13A can operate in a manner shown by a timing chart of FIG. 13B in a display period. The control signal supplied to the terminal SW is set to L level, the video signal $D_V$ is input from the terminal D when the latch signal from the terminal LS is set to H level (Time $T_{LAT}$), and the video signal $D_V$ keeps being output from the terminal Q even after the latch signal from the terminal LS is set to L level. With this configuration, the video signal $D_V$ that has been stored once can keep being output.

Figure 13C:
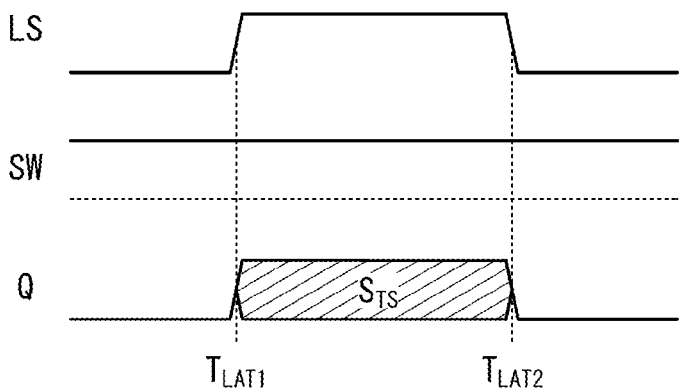

The latch circuit LAT_B illustrated in FIG. 13A can operate in a manner shown by a timing chart of FIG. 13C in a touch sensing period. The control signal supplied to the terminal SW is set to H level, the signal $S_{TS}$ is input from the terminal D when the latch signal from the terminal LS is set to H level (Time $T_{LAT1}$), and initialization (e.g., to L level) is performed when the latch signal from the terminal LS is set to L level (Time $T_{LAT2}$). With this configuration, a signal corresponding to the driving signal supplied to the terminal LS can be output to the D/A converter circuit.

As described above, the signal output circuit 110B can switch the output between the video signals $S_V[1]$ to $S_V[240]$ and the driving signals $S_{TS}[1]$ to $S_{TS}[24]$ by changing the signal supplied from the controller 130. Since a video signal and a driving signal can be output to a source line using the same circuit, a source driver for performing display and a driver circuit for driving a touch sensor can be combined in one circuit. One circuit having various functions leads to miniaturization of the circuit and consequently enables reduced frame width or reduced cost.

Embodiment 2

In this embodiment, a structure example of a block diagram of a touch panel in which the integrated circuit which is a semiconductor device described in Embodiment 1 can be employed and an example of a circuit configuration of a pixel and a driving/sensing electrode included in a display/sensor portion are described.

Structural Example of Block Diagram of Touch Panel

Figure 14:
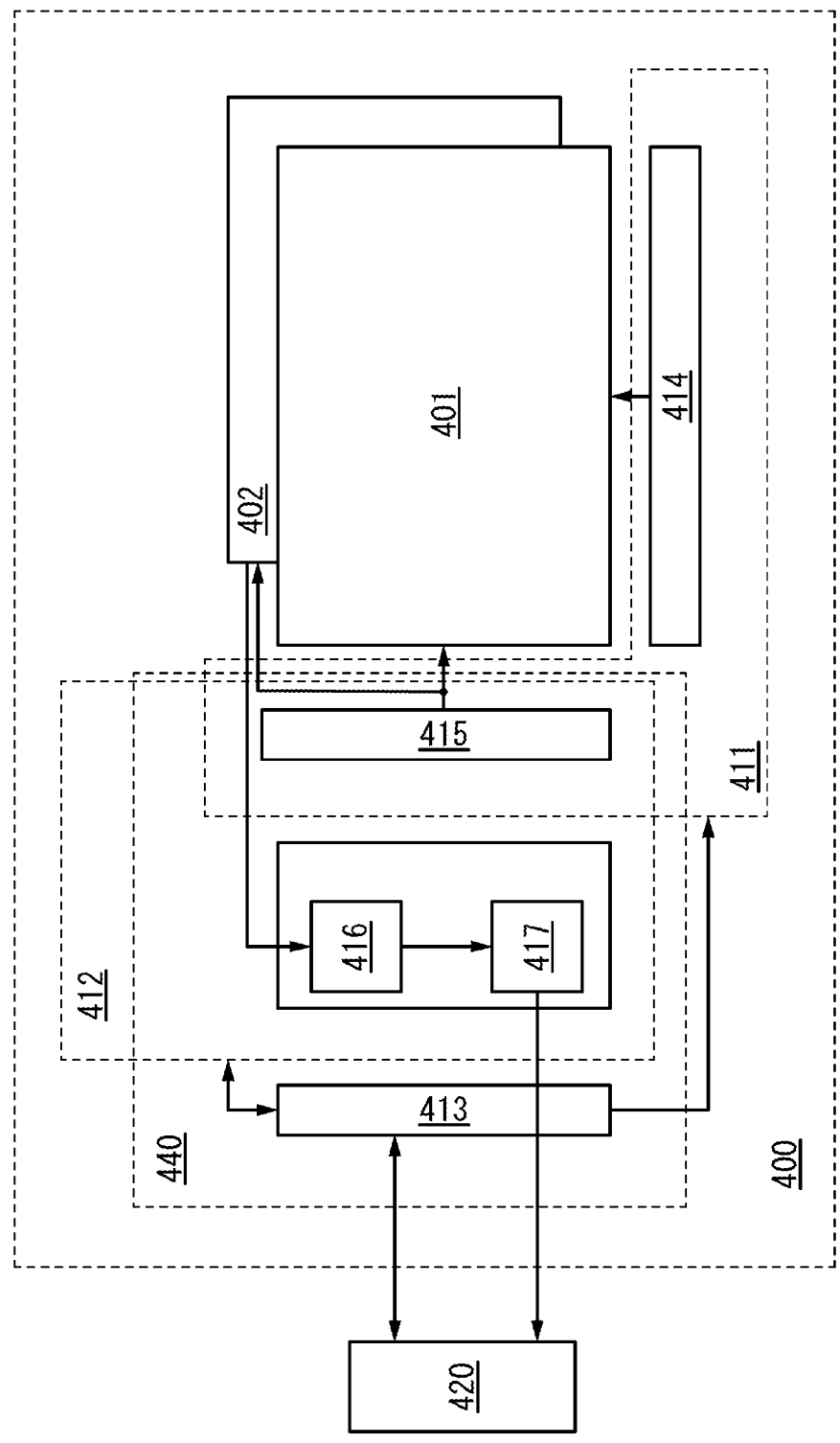
FIG. 14 is a block diagram illustrating one embodiment of the present invention.

FIG. 14 is a block diagram of a full in-cell, hybrid in-cell, or on-cell touch panel and its peripheral circuits. A touch panel 400 includes a display portion 401 and a sensor portion 402. Furthermore, the touch panel 400 includes, as examples of peripheral circuits for driving the display portion 401 and the sensor portion 402, a display driver circuit 411, a touch sensor driver circuit 412, and a timing controller 413. As another peripheral circuit, a power supply circuit or the like for generating a power supply voltage needed for the display portion 401 and the sensor portion 402 may also be provided.

The display driver circuit 411 includes a gate driver 414 and a source driver 415, for example. The gate driver 414 and the source driver 415 are capable of controlling display by sequentially driving pixels (not illustrated) provided in a matrix in the display portion 401.

The source driver 415 has a function of outputting video signals to source lines as described in the above embodiment and supplying analog signals to the source lines also functioning as driving electrodes (Tx) of the sensor portion.

Note that integrated circuits (ICs) formed over a silicon substrate can be used as some circuits included in the timing controller 413 and the display driver circuit 411 and the touch sensor driver circuit 412 including the source driver 415, so that the circuits can be provided over a substrate over which the touch panel 400 is provided, an FPC connected to the substrate over which the touch panel 400 is provided, or the like. Therefore, in the block of the touch panel 400 in FIG. 14, an IC 440 is illustrated including the source driver 415, a sensing circuit 416, a transmitting circuit 417, and the timing controller 413.

Thus, by combining the driver circuit of the touch sensor and the source driver in one circuit and incorporating other circuits or the like for processing signals of the touch sensor in one IC, miniaturization of the IC becomes possible. The IC miniaturization enables reduced frame width of the touch sensor or reduced cost due to an increase in the number of ICs obtained from one substrate.

In the case where the number of pixels or the frame frequency is increased, two or more gate drivers 414 and source drivers 415 may be provided and the pixels may be divided into a plurality of display regions to be controlled on a region basis. With such a structure, the definition of a displayed image, the signal writing speed, or the like can be higher.

The touch sensor driver circuit 412 includes the sensing circuit 416 and the transmitting circuit 417, for example. The sensing circuit 416 mainly processes an analog signal. The transmitting circuit 417 mainly processes a digital signal.

The sensing circuit 416 has a function of, for example, receiving an analog signal from the sensing electrode (Rx) side of the sensor portion 402 and converting it into a digital signal. As the sensing circuit 416, an integrator circuit, a sample-and-hold circuit, an analog/digital (A/D) converter, or the like can be used.

The transmitting circuit 417 is a circuit that performs signal processing such as noise elimination from a digital signal output from the sensing circuit 416, sensing of a touch position, and tracking of the touch position, for example. Data that can be obtained by signal processing in the transmitting circuit 417 can be output to a host controller 420 that is positioned outside the touch panel 400.

The timing controller 413 is, for example, a circuit that receives a video signal or the like from the host controller 420 and generates a signal for controlling the display driver circuit 411, such as a clock signal, a vertical synchronization signal, or a horizontal synchronization signal. Furthermore, the timing controller 413 is, for example, a circuit that receives a signal from the host controller 420 and generates a signal for controlling the touch sensor driver circuit 412.

Note that a variety of signals received from the outside host controller 420 can be input to the timing controller 413 through an interface such as a digital visual interface (DVI), a low voltage differential signaling (LVDS), or a reduced swing differential signaling (RSDS).

The host controller 420 is a circuit for receiving and sending a variety of signals from/to the peripheral circuits of the touch panel. For example, the host controller 420 includes an arithmetic circuit or a frame memory, and receives and sends signals from/to the touch panel 400 or another device.

Figure 15A:
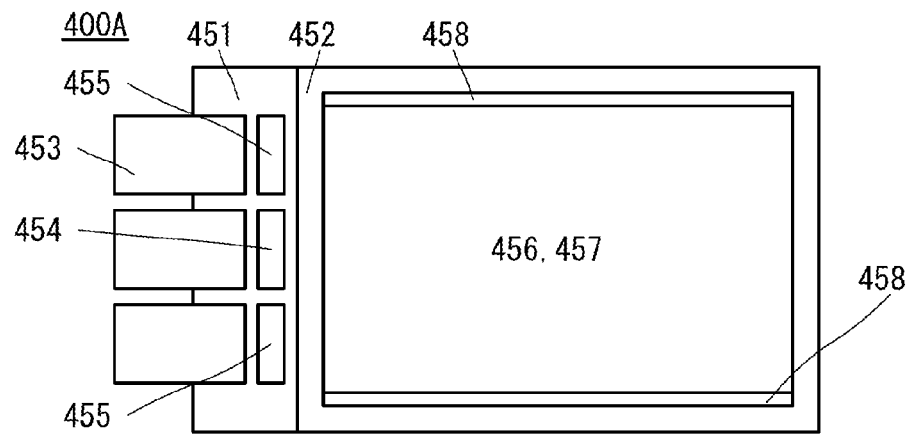
FIGS. 15A to 15C are block diagrams each illustrating one embodiment of the present invention.
Figure 15B:
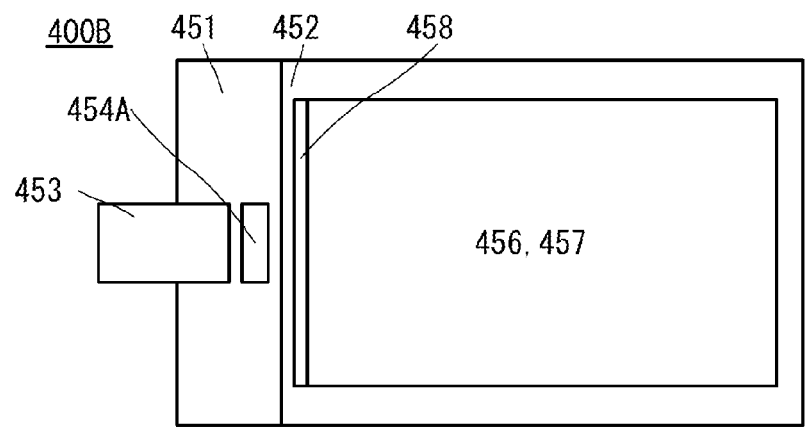
Figure 15C:
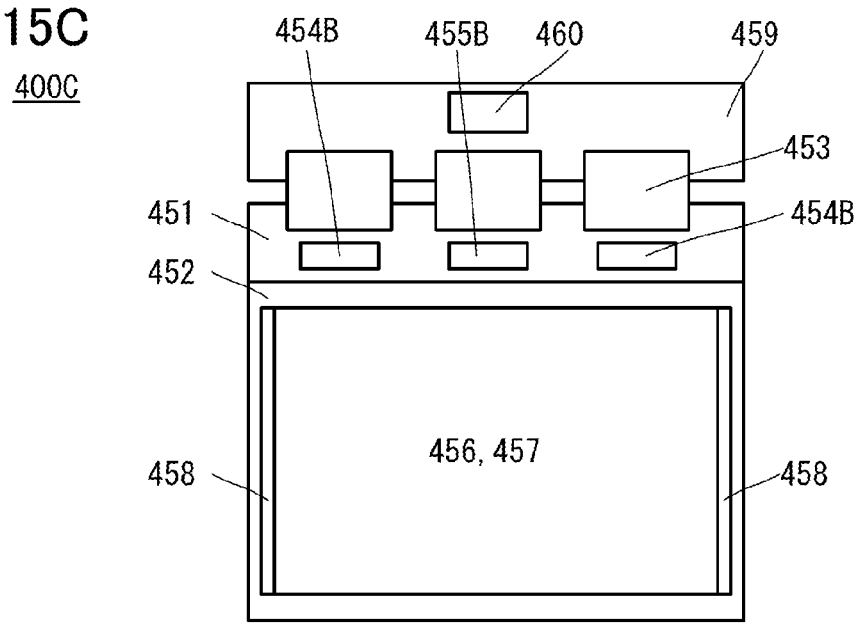

FIGS. 15A to 15C are each a schematic diagram illustrating an example of mounting an IC on a touch panel.

In FIG. 15A, a touch panel 400A includes a substrate 451, a counter substrate 452, a plurality of FPCs 453, an IC 454, ICs 455, and the like. A display portion 456, a touch sensor portion 457, and gate drivers 458 are provided between the substrate 451 and the counter substrate 452. The IC 454 and the ICs 455 are mounted on the substrate 451 by a chip on glass (COG) method or the like.

The IC 454 and the ICs 455 each include the circuit functioning as the IC 440 described with reference to FIG. 14. The IC 454 can be miniaturized by having a structure in which the driver circuit of the touch sensor and the source driver are combined in one circuit and other circuits or the like for processing signals of the touch sensor are incorporated in one IC. The IC miniaturization enables reduced frame width of the touch sensor or reduced cost due to an increase in the number of ICs obtained from one substrate.

FIG. 15B illustrates an example in which one IC 454A and one FPC 453 are mounted in a touch panel 400B. The IC 454A includes the circuit functioning as the IC 440 described with reference to FIG. 14. The IC 454A can be miniaturized by having a structure in which the driver circuit of the touch sensor and the source driver are combined in one circuit and other circuits or the like for processing signals of the touch sensor are incorporated in one IC. The IC miniaturization enables reduced frame width of the touch sensor or reduced cost due to an increase in the number of ICs obtained from one substrate. It is preferable to bring functions into one IC 454A in this manner because the number of components can be reduced. In the example illustrated in FIG. 15B, the gate driver 458 is provided along one on the FPC 453 side of two short sides of the display portion 456.

FIG. 15C illustrates an example of the structure including a printed circuit board (PCB) 459 on which an IC 460 having some functions of the ICs 454 and 454A illustrated in FIGS. 15A and 15B or the like is mounted. ICs 454B and an IC 455B on the substrate 451 are electrically connected to the PCB 459 through the FPCs 453.

In FIGS. 15A to 15C, the ICs 454, 454A, 454B, 455, and 455B may be mounted on the FPC 453, not on the substrate 451. For example, the ICs 454, 454A, 454B, 455, and 455B may be mounted on the FPC 453 by a chip on film (COF) method, a tape automated bonding (TAB) method, or the like.

A structure where the FPC 453 and the ICs 454 and 454A are provided on a short side of the display portion 456 as illustrated in FIGS. 15A and 15B enables the frame of the display device to be narrowed; thus, the structure is preferably used for electronic devices such as smartphones, mobile phones, and tablet terminals, for example. The structure with the PCB 459 illustrated in FIG. 15C can be preferably used for television devices, monitors, tablet terminals, or laptop personal computers, for example.

Circuit Configuration of Pixel and Driving/Sensing Electrode

Figure 16A:
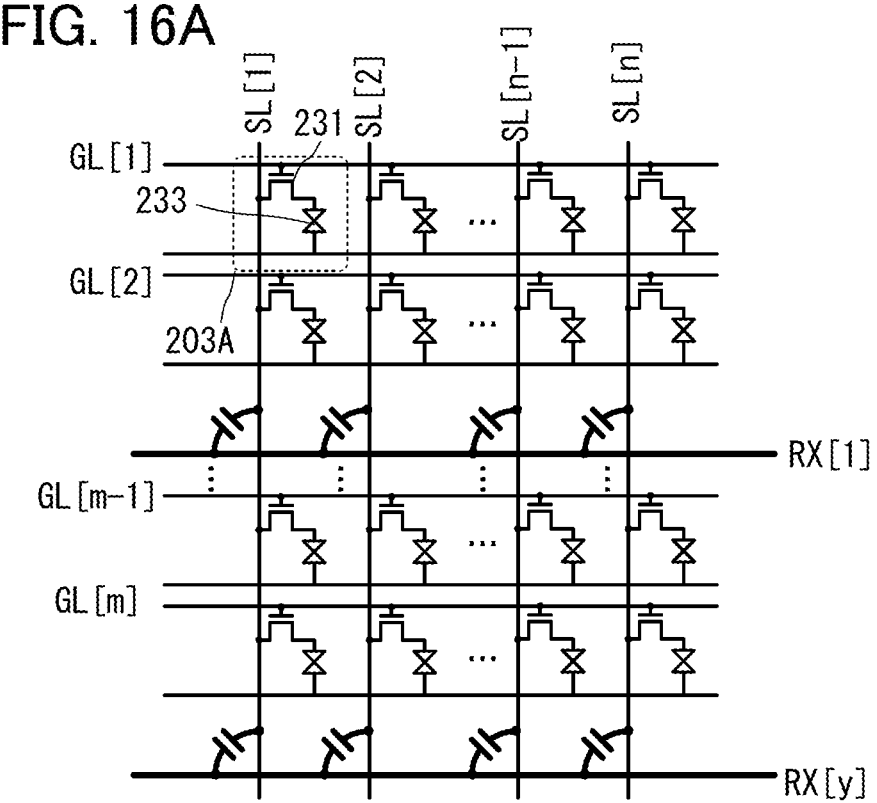
FIGS. 16A and 16B are circuit diagrams each illustrating one embodiment of the present invention.

A pixel 203A illustrated in FIG. 16A is an example of a pixel of a touch panel including a liquid crystal element in a display portion and includes a transistor 231 and a liquid crystal element 233. Although not shown, the pixel 203A may include a capacitor.

The transistor 231 has a function of a switching element that controls the connection between the liquid crystal element 233 and any one of the source lines SL[1] to SL[n]. The on/off state of the transistor 231 is controlled by a scan signal input to its gate through any one of the gate lines GL[1] to GL[m].

The liquid crystal element 233 is, for example, an element including a common electrode, a pixel electrode, and a liquid crystal. Alignment of the liquid crystal material of the liquid crystal is changed by the action of an electric field generated between the common electrode and the pixel electrode.

Note that wirings Rx[1] to Rx[y] functioning as sensing electrodes, which are provided to pair up with the source lines SL[1] to SL[n] functioning as driving electrodes (Tx), may be orthogonal to the source lines SL[1] to SL[n].

Figure 16B:
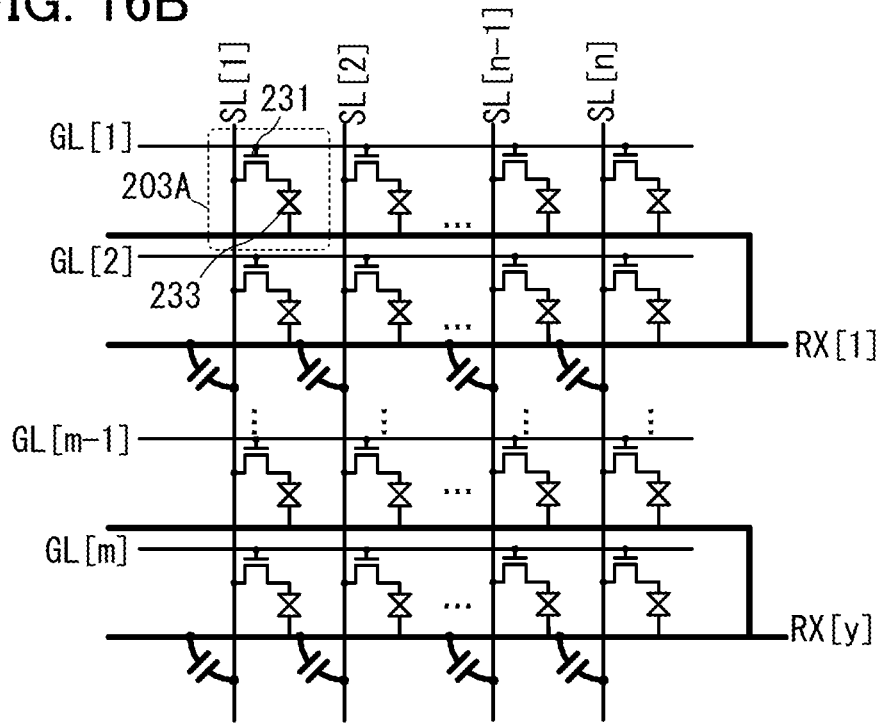

Note that as the wirings Rx[1] to Rx[y] functioning as sensing electrodes, wirings connected to the common electrodes connected to the liquid crystal elements 233 may be used. The circuit configuration in this case is illustrated in FIG. 16B.

Figure 17:
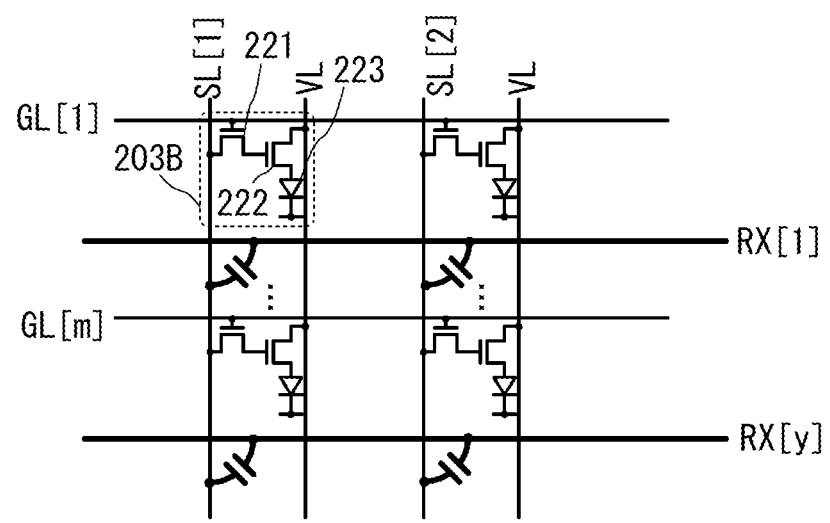
FIG. 17 is a circuit diagram illustrating one embodiment of the present invention.

A pixel 203B in FIG. 17 is an example of a pixel included in a touch panel including a light-emitting element in a display portion and includes a transistor 221, a transistor 222, and a light-emitting element 223. FIG. 17 illustrates power supply lines VL in addition to gate lines GL[1] to GL[m] and source lines SL[1] to SL[n]. The power supply lines VL are wirings for supplying current to the EL element 223.

The transistor 221 serves as a switching element for controlling the connection between a gate of the transistor 222 and any one of the source lines SL[1] to SL[n]. The on/off state of the transistor 221 is controlled by a scan signal input to its gate through the gate line GL.

The transistor 222 has a function of controlling current flowing between the power supply line VL and the light-emitting element 223, in accordance with voltage applied to the gate of the transistor 222.

The light-emitting element 223 is, for example, an element including a light-emitting layer between electrodes. The luminance of the light-emitting element 223 can be controlled by the amount of current that flows through the light-emitting layer.

Note that in a manner similar to those of FIGS. 16A and 16B, wirings Rx[1] to Rx[y] functioning as sensing electrodes, which are provided to pair up with the source lines SL[1] to SL[n] functioning as driving electrodes (Tx), may be orthogonal to the source lines SL[1] to SL[n].

Embodiment 3

In this embodiment, an example of a cross-sectional structure of a semiconductor device in one embodiment of the present invention will be described with reference FIG. 18.

In the semiconductor device described in the above embodiment, each circuit such as a shift register circuit can be formed using transistors containing silicon or the like. As silicon, polycrystalline silicon, microcrystalline silicon, or amorphous silicon can be used. Note that an oxide semiconductor or the like can be used instead of silicon.

Figure 18:
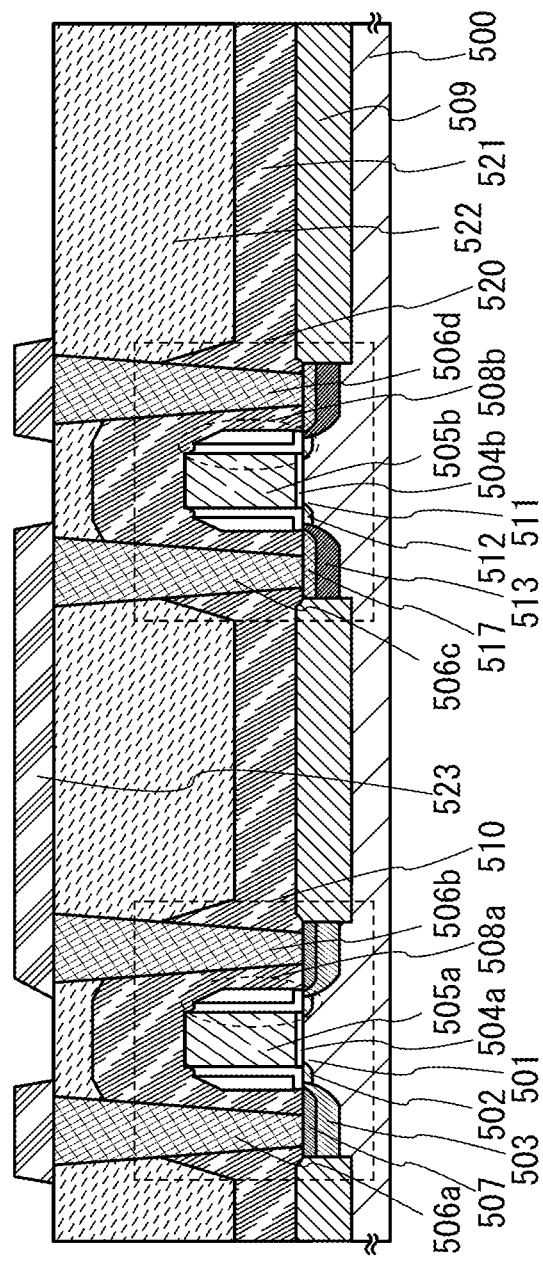
FIG. 18 is a cross-sectional view illustrating one embodiment of the present invention.

FIG. 18 is a schematic cross-sectional view of a semiconductor device of one embodiment of the present invention. The semiconductor device in the schematic cross-sectional view of FIG. 18 includes an n-channel transistor and a p-channel transistor that contain a semiconductor material (e.g., silicon).

An n-channel transistor 510 includes a channel formation region 501 in a substrate 500 containing a semiconductor material, low-concentration impurity regions 502 and high-concentration impurity regions 503 (collectively referred to simply as impurity regions in some cases) with the channel formation region 501 placed between the impurity regions, intermetallic compound regions 507 in contact with the impurity regions, a gate insulating film 504a over the channel formation region 501, a gate electrode layer 505a over the gate insulating film 504a, and a source electrode layer 506a and a drain electrode layer 506b in contact with the intermetallic compound regions 507. A sidewall insulating film 508a is provided on a side surface of the gate electrode layer 505a. An interlayer insulating film 521 and an interlayer insulating film 522 are provided to cover the transistor 510. The source electrode layer 506a and the drain electrode layer 506b are connected to the intermetallic compound regions 507 through openings formed in the interlayer insulating films 521 and 522.

A p-channel transistor 520 includes a channel formation region 511 in the substrate 500 containing the semiconductor material, low-concentration impurity regions 512 and high-concentration impurity regions 513 (collectively referred to simply as impurity regions in some cases) with the channel formation region 511 placed between the impurity regions, intermetallic compound regions 517 in contact with the impurity regions, a gate insulating film 504b over the channel formation region 511, a gate electrode layer 505b over the gate insulating film 504b, and a source electrode layer 506c and a drain electrode layer 506d in contact with the intermetallic compound regions 517. A sidewall insulating film 508b is provided on a side surface of the gate electrode layer 505b. The interlayer insulating films 521 and 522 are provided to cover the transistor 520. The source electrode layer 506c and the drain electrode layer 506d are connected to the intermetallic compound regions 517 through openings formed in the interlayer insulating films 521 and 522.

An element isolation insulating film 509 is provided in the substrate 500 to surround the transistors 510 and 520.

Although FIG. 18 shows the case where the channels of the transistors 510 and 520 are formed in the semiconductor substrate, the channels of the transistors 510 and 520 may be formed in an amorphous semiconductor film or a polycrystalline semiconductor film formed over an insulating surface. Alternatively, the channels of the transistors may be formed in a single crystal semiconductor film, as in the case of using an SOI substrate.

When the transistors 510 and 520 are formed using a single crystal semiconductor substrate, the transistors 510 and 520 can operate at high speed. Accordingly, a single crystal semiconductor substrate is preferably used for transistors that form each circuit in the above embodiment.

The transistor 510 is connected to the transistor 520 through a wiring 523. It is possible to employ a structure where an interlayer insulating film and an electrode layer are provided over the wiring 523 and another transistor is stacked over them.

Embodiment 4

In this embodiment, an example in which the semiconductor device described in the above embodiment is used in a touch panel, a structure example of a block diagram of the touch panel, and usage examples of touch panels in electronic devices are described with reference to FIGS. 19A and 19B, FIG. 20, and FIGS. 21A to 21E.

Mounting Example on Touch Panel

An example of mounting a semiconductor device on a touch panel is described with reference to FIGS. 19A and 19B.

Figure 19A:
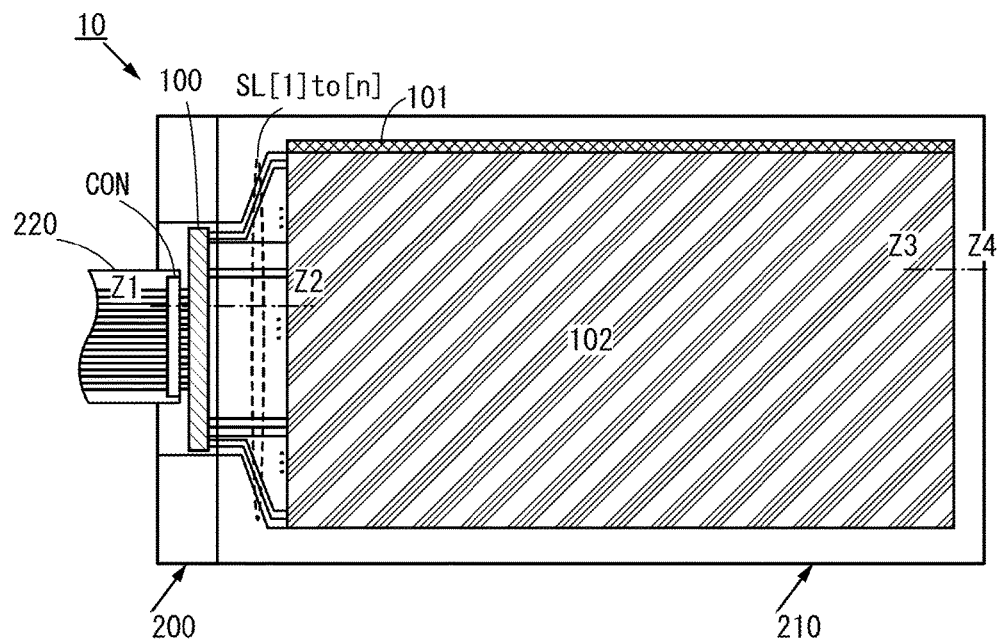
FIGS. 19A and 19B are a top view and a cross-sectional view illustrating one embodiment of the present invention.
Figure 19B:
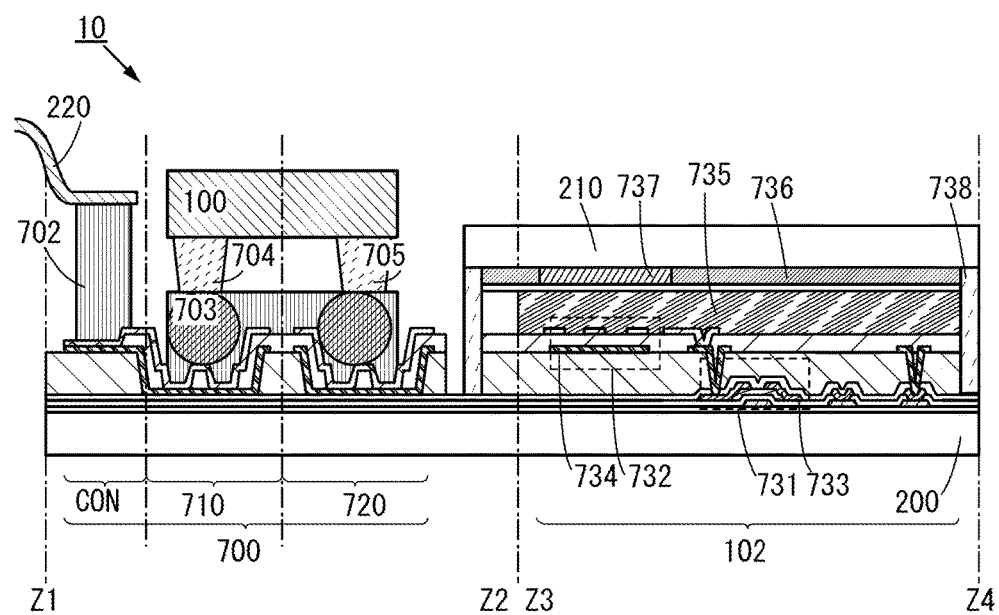

FIG. 19A is a top view of the semiconductor device 10, and FIG. 19B is an enlarged view illustrating the integrated circuit 100 and a periphery thereof.

The semiconductor device 10 includes a pair of substrates 200 and 210. The semiconductor device 10 further includes the integrated circuit 100 having functions of both a source driver and a driver circuit of a touch sensor, the gate driver 101, and the display/sensor portion 102. A flexible printed circuit (FPC) 220 is connected to a connection portion CON of the substrate 200. A wiring provided in the connection portion CON is connected to an input terminal of the integrated circuit 100. The source lines SL[1] to SL[n] extending toward the display/sensor portion 102 are connected to an output terminal of the integrated circuit 100.

FIG. 19B is a cross-sectional view of the semiconductor device 10 taken along line Z1-Z2 and line Z3-Z4 in FIG. 19A. In FIG. 19B, a liquid crystal element is illustrated as an example of a display element included in the display/sensor portion 102. Note that the display element may be a light-emitting element including an EL layer between electrodes.

A terminal portion 700 in the cross-sectional view along the line Z1-Z2 includes a terminal portion 710, a terminal portion 720, a connection portion CON, and the like. The terminal portion 710 and the terminal portion 720 are connected to the integrated circuit 100, and the connection portion CON is connected to the FPC 220 through a connection layer 702.

The connection portion CON is connected to the input terminal of the integrated circuit 100 through the connection layer 702 and a contact 704. The output terminal of the integrated circuit 100 is connected to a conductive layer connected to the display/sensor portion 102 through a connection layer 703, the contact 704, and a contact 705.

The display/sensor portion 102 illustrated in the cross-sectional view along the line Z3-Z4 includes a plurality of pixels and a conductive layer functioning as an electrode of a touch sensor. For example, one pixel includes a transistor 731 and a liquid crystal element 732 between the substrate 200 and the substrate 210. The touch sensor includes a conductive layer 733 functioning as one of a source and a drain of the transistor 731 and a conductive layer 734 functioning as one of electrodes between which a liquid crystal layer of the liquid crystal element 732 is sandwiched. A liquid crystal 735 is included between the substrate 200 and the substrate 210. A light-blocking layer 736, a coloring layer 737, and the like may be included on the substrate 210 side. A sealant 738 may be provided on end portions of the substrates 200 and 210.

Components

Components illustrated in FIG. 19B are described below.

Connection Layers and Contacts

As the connection layers 702 and 703 and the contacts 704 and 705, an anisotropic conductive film (ACF), an anisotropic conductive paste (ACP), or the like can be used.

Substrates

A material having a flat surface can be used as the substrates 200 and 210. The substrate through which light emitted from the display element is extracted is formed using a material that transmits the light. For example, a material such as glass, quartz, ceramics, sapphire, or an organic resin can be used. Alternatively, a single crystal semiconductor substrate or a polycrystalline semiconductor substrate made of silicon, silicon carbide, or the like, a compound semiconductor substrate made of silicon germanium or the like, an SOI substrate, or the like may be used. Still alternatively, any of these substrates provided with a semiconductor element may be used as the substrate. Alternatively, a flexible substrate may be used as the substrate, and a transistor, a capacitor, or the like may be provided directly over the flexible substrate.

Examples of a material having flexibility and a light-transmitting property with respect to visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used.

Transistor

A transistor that can be used as the transistor 731 or the like includes a conductive layer functioning as the gate electrode, the semiconductor layer, a conductive layer functioning as the source electrode, a conductive layer functioning as the drain electrode, and the insulating layer functioning as the gate insulating layer. In the above example, a bottom-gate transistor is used.

Note that there is no particular limitation on the structure of the transistor. For example, a planar transistor, a staggered transistor, or an inverted staggered transistor may be used. A top-gate transistor or a bottom-gate transistor may be used. Gate electrodes may be provided above and below a channel. There is no particular limitation on a semiconductor material used for the transistor, and an oxide semiconductor, silicon, or germanium can be used, for example.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because the off-state current of the transistor can be reduced.

For example, the oxide semiconductor preferably contains at least indium (In) or zinc (Zn). The oxide semiconductor further preferably contains an In-M-Zn oxide (M is a metal such as Al, Ti, Ga, Ge, Y, Zr, Sn, La, Ce, Hf, or Nd).

Alternatively, silicon is preferably used as a semiconductor in which a channel of the transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has a higher field-effect mobility and a higher reliability than amorphous silicon. When such a polycrystalline semiconductor is used in a pixel, the aperture ratio of the pixel can be improved. Even in the case where pixels are provided at extremely high resolution, a gate driver circuit and a source driver circuit can be formed over the same substrate over which the pixels are formed, and the number of components of an electronic device can be reduced.

Conductive Layer

As conductive layers such as a gate, a source, and a drain of the transistor and a wiring and an electrode, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may also be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or a graphene compound can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case where the metal material or the alloy material (or the nitride thereof) is used, the thickness is set small enough to be able to transmit light. Alternatively, a stack of any of the above materials can be used as the conductive layer. For example, a stacked film of indium tin oxide and an alloy of silver and magnesium is preferably used because the conductivity can be increased. They can also be used for conductive layers such as a variety of wirings and electrodes included in a touch panel, and an electrode (e.g., a pixel electrode or a common electrode) included in a display element.

Alternatively, for the conductive layer, an oxide semiconductor similar to that of the semiconductor layer is preferably used. In that case, it is preferable that the conductive layer be formed to have a lower electric resistance than a region in the semiconductor layer where a channel is formed.

For example, such a conductive layer can be used as the conductive layer functioning as the second gate electrode of the transistor. Alternatively, it can be used as another light-transmitting conductive layer.

Insulating Layer

Examples of an insulating material that can be used for the insulating layers, an overcoat, a spacer, and the like include a resin such as an acrylic or an epoxy, a resin having a siloxane bond, and an inorganic insulating material such as silicon oxide, silicon oxynitride, silicon nitride oxide, silicon nitride, or aluminum oxide.

Liquid Crystal Element

In the example illustrated here, the liquid crystal element 732 is a liquid crystal element using a fringe field switching (FFS) mode. However, one embodiment of the present invention is not limited thereto, and a liquid crystal element using any of a variety of modes can be used. For example, a liquid crystal element using a vertical alignment (VA) mode, a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode, may be used as the semiconductor device 10. Examples of the vertical alignment mode include a multi-domain vertical alignment (MVA) mode, a patterned vertical alignment (PVA) mode, and an advanced super-view (ASV) mode.

The liquid crystal element is an element that controls transmission and non-transmission of light by optical modulation action of the liquid crystal. Note that optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on the conditions.

As the liquid crystal material, either of positive liquid crystal and negative liquid crystal may be used, and an appropriate liquid crystal material can be used depending on the mode or design to be used.

In the case where a horizontal electric field mode is employed, liquid crystal exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and has optical isotropy. In addition, the liquid crystal composition which includes liquid crystal exhibiting a blue phase and a chiral material does not need alignment treatment and has a small viewing angle dependence. An alignment film does not need to be provided and rubbing treatment is thus not necessary; accordingly, electrostatic discharge damage caused by the rubbing treatment can be prevented, and defects and damage of the liquid crystal display device in the manufacturing process can be reduced.

Coloring Layer and Light-Blocking Layer

As examples of materials that can be used for the light-blocking layer 736, the coloring layer 737, a metal material, a resin material, and a resin material containing a pigment or dye can be given.

Sealant

A sealant used as the sealant 738 has a function of bonding substrates to each other. The sealant has a refractive index higher than that of air.

Application Example of Touch Panel

Next, an application example of a touch panel module using the touch panel illustrated in FIGS. 19A and 19B will be described with reference to FIG. 20.

Figure 20:
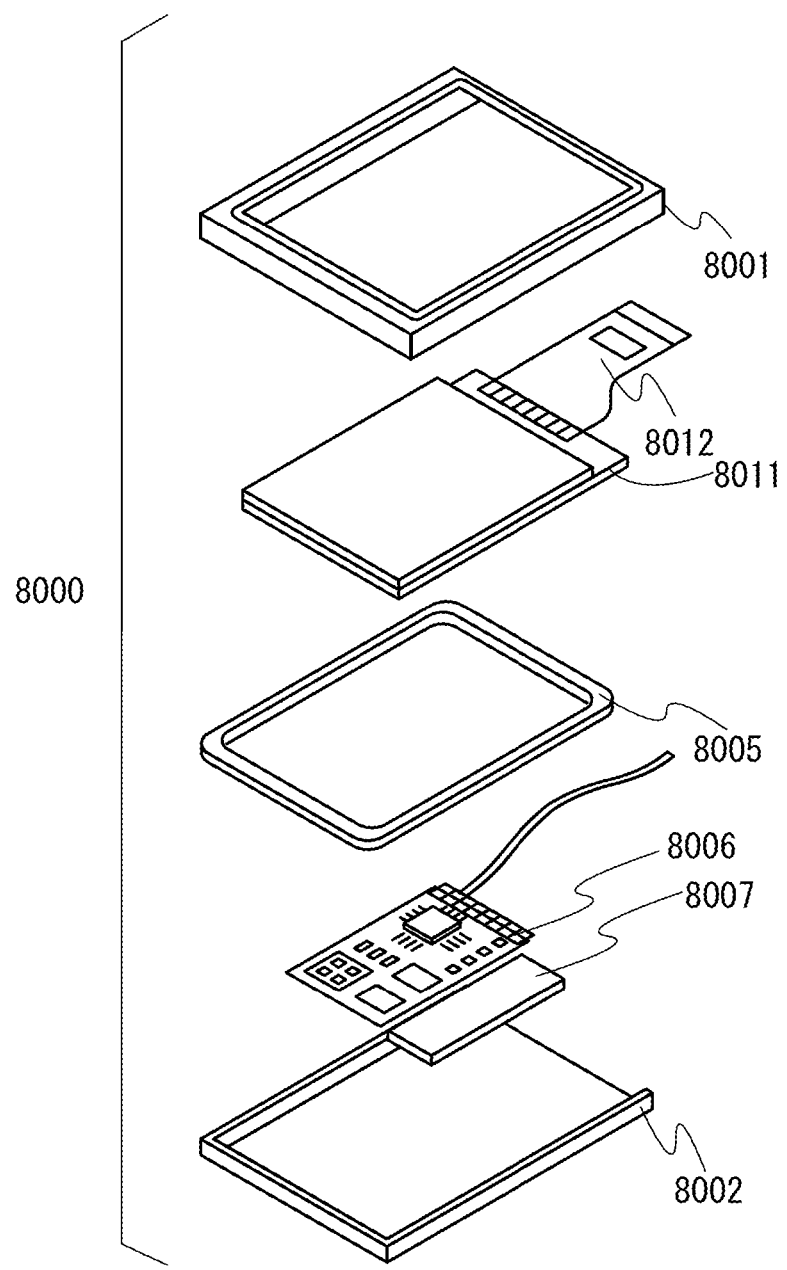
FIG. 20 is a schematic view illustrating one embodiment of the present invention.

In a touch panel module 8000 illustrated in FIG. 20, a touch panel 8011 connected to an FPC 8012, a frame 8005, a printed board 8006, and a battery 8007 are provided between an upper cover 8001 and a lower cover 8002. Note that a backlight unit or the like may be provided in the case where the display element included in the touch panel module 8000 is a liquid crystal element.

The semiconductor device described in the above embodiment can be used as the touch panel 8011 in FIG. 20. Therefore, reduced frame width or reduced cost of the touch panel module 8000 can be achieved.

The shape and size of the upper cover 8001 and the lower cover 8002 can be changed as appropriate in accordance with the size of the touch panel 8011 and the like.

The touch panel 8011 can employ a resistive touch sensor or a capacitive touch sensor.

The frame 8005 protects the touch panel 8011 and the like and functions as an electromagnetic shield for blocking electromagnetic waves generated by the operation of the printed board 8006. The frame 8005 may also have a function of a radiator plate.

The printed board 8006 is provided with a circuit for outputting a variety of signals for driving the touch panel 8011 and the like. As a power source for supplying power to each circuit on the printed board 8006, an external commercial power source or a power source using the battery 8007 provided separately may be used. The battery 8007 can be omitted in the case of using a commercial power source.

The touch panel module 8000 may be additionally provided with a polarizing plate, a retardation plate, a prism sheet, or the like.

Usage Example in Electronic Device

Next, the description is made on the case where the above-described touch panel module is used as a touch panel module of an electronic device such as a computer, a portable information terminal (including a mobile phone, a portable game machine, and an audio reproducing device), electronic paper, a television device (also referred to as television or television receiver), or a digital video camera.

Figure 21A:
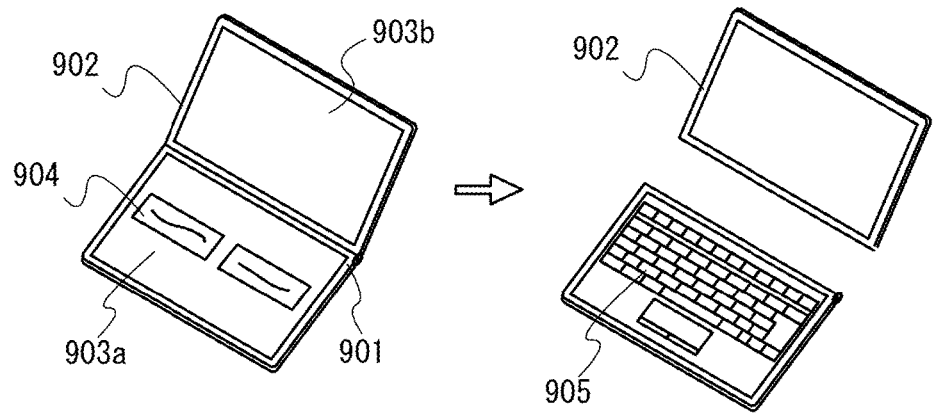
FIGS. 21A to 21E each illustrate one embodiment of the present invention.

FIG. 21A illustrates a portable information terminal that includes a housing 901, a housing 902, a first display portion 903a, a second display portion 903b, and the like. At least one of the housings 901 and 902 is provided with a display module including the semiconductor device of the foregoing embodiment. Thus, a portable information terminal with reduced frame width can be provided at low cost.

The first display portion 903a is a panel having a touch input function, and for example, as illustrated in the left of FIG. 21A, which of "touch input" and "keyboard input" is performed can be selected by a selection button 904 displayed on the first display portion 903a. Since selection buttons with a variety of sizes can be displayed, the information terminal can be easily used by people of any generation. For example, when "keyboard input" is selected, a keyboard 905 is displayed on the first display portion 903a as illustrated in the right of FIG. 21A. Thus, letters can be input quickly by key input as in a conventional information terminal, for example.

One of the first display portion 903a and the second display portion 903b can be detached from the portable information terminal as shown in the right of FIG. 21A. Providing the second display portion 903b with a touch input function makes the information terminal convenient because a weight to carry around can be further reduced and the information appliance can operate with one hand while the other hand supports the housing 902.

The portable information terminal in FIG. 21A can be equipped with a function of displaying a variety of information (e.g., a still image, a moving image, and a text image); a function of displaying a calendar, a date, the time, or the like on the display portion; a function of operating or editing information displayed on the display portion; a function of controlling processing by various kinds of software (programs); and the like. Furthermore, an external connection terminal (e.g., an earphone terminal or a USB terminal), a recording medium insertion portion, and the like may be provided on the back surface or the side surface of the housing.

The portable information terminal in FIG. 21A may transmit and receive data wirelessly. Through wireless communication, desired book data or the like can be purchased and downloaded from an e-book server.

In addition, the housing 902 in FIG. 21A may be equipped with an antenna, a microphone function, and a wireless communication function to be used as a mobile phone.

Figure 21B:
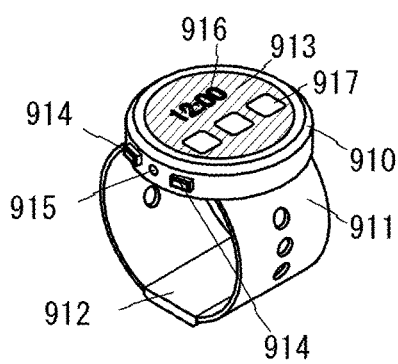

FIG. 21B is a wrist-watch-type portable information terminal consisting of a housing 910, a band 911, and a buckle 912. The housing 910 is provided with a display portion 913, a control portion 914, and a sensor 915. The display portion 913 has a function of a touch sensor and thereby a clock display portion 916 and an icon 917 can be touched for operation. A display module including the semiconductor device described in any of the above embodiments is provided in the housing 910. Therefore, a wrist-watch-type portable information terminal with reduced frame width can be provided at low cost.

Figure 21C:
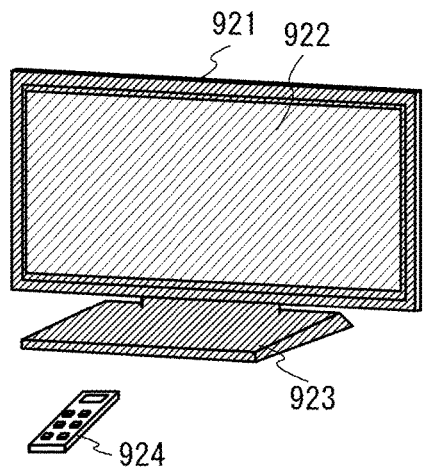

FIG. 21C illustrates a television device including a housing 921, a display portion 922, a stand 923, and the like. The television device can be controlled by a switch of the housing 921 and a remote controller 924. A display module including the semiconductor device of the foregoing embodiment is mounted on the housing 921 and the remote controller 924. Thus, a television device with reduced frame width can be provided at low cost.

Figure 21D:
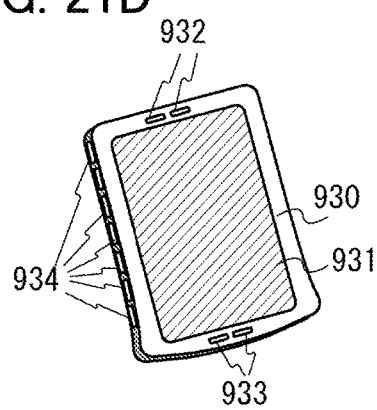

FIG. 21D illustrates a smartphone in which a main body 930 is provided with a display portion 931, a speaker 932, a microphone 933, an operation button 934, and the like. A display module including the semiconductor device of the foregoing embodiment is provided in the main body 930. Thus, a smartphone with reduced frame width can be provided at low cost.

Figure 21E:
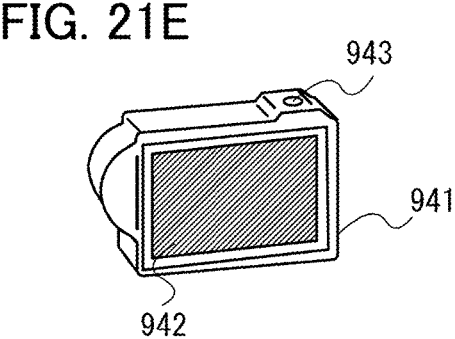

FIG. 21E illustrates a digital camera including a main body 941, a display portion 942, an operation switch 943, and the like. A display module including the semiconductor device of the foregoing embodiment is provided in the main body 941. Thus, a digital camera with reduced frame width can be provided at low cost.

As described above, the electronic devices shown in this embodiment each incorporate a display module including the semiconductor device of the foregoing embodiment, thereby being reduced in frame width and cost.

Notes on the Description in This Specification and the Like

The following are notes on the description of the above embodiments and structures in the embodiments.

Notes on One Embodiment of the Present Invention Described in Embodiments

One embodiment of the present invention can be constituted by appropriately combining the structure described in an embodiment with any of the structures described the other embodiments. In addition, in the case where a plurality of structure examples are described in one embodiment, some of the structure examples can be combined as appropriate.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

Notes on the Description for Drawings

In this specification and the like, terms for explaining arrangement, such as "over" and "under", are used for convenience to describe the positional relation between components with reference to drawings. Furthermore, the positional relation between components is changed as appropriate in accordance with a direction in which the components are described. Therefore, the terms for explaining arrangement are not limited to those used in this specification and may be changed to other terms as appropriate depending on the situation.

The term "over" or "below" does not necessarily mean that a component is placed directly on or directly below and directly in contact with another component. For example, the expression "electrode B over insulating layer A" does not necessarily mean that the electrode B is on and in direct contact with the insulating layer A and can mean the case where another component is provided between the insulating layer A and the electrode B.

Furthermore, in a block diagram in this specification and the like, components are functionally classified and shown by blocks that are independent from each other. However, in an actual circuit and the like, such components are sometimes hard to classify functionally, and there is a case in which one circuit is concerned with a plurality of functions or a case in which a plurality of circuits are concerned with one function. Therefore, the segmentation of blocks in the block diagram is not limited by the components described in the specification, and can be differently determined as appropriate depending on situations.

In drawings, the size, the layer thickness, or the region is determined arbitrarily for description convenience. Therefore, the size, the layer thickness, or the region is not limited to the illustrated scale. Note that the drawings are schematically shown for clarity, and embodiments of the present invention are not limited to shapes or values shown in the drawings. For example, the following can be included: variation in signal, voltage, or current due to noise or difference in timing.

Notes on Expressions That Can Be Rephrased

In this specification or the like, in description of connections of a transistor, description of "one of a source and a drain" (or a first electrode or a first terminal), and "the other of the source and the drain" (or a second electrode or a second terminal) are used. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In addition, in this specification and the like, the term such as an "electrode" or a "wiring" does not limit a function of the component. For example, an "electrode" is used as part of a "wiring" in some cases, and vice versa. Further, the term "electrode" or "wiring" can also mean a combination of a plurality of "electrodes" and "wirings" formed in an integrated manner.

In this specification and the like, "voltage" and "potential" can be replaced with each other. The term "voltage" refers to a potential difference from a reference potential. When the reference potential is a ground voltage, for example, "voltage" can be replaced with "potential." The ground potential does not necessarily mean 0 V. Potentials are relative values, and the potential applied to a wiring or the like is changed depending on the reference potential, in some cases.

In this specification and the like, the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

This specification and the like show a 1T-1C pixel circuit structure of a liquid crystal display device where one pixel has one transistor and one capacitor and a 2T-1C pixel circuit structure of an EL display device where one pixel has two transistors and one capacitor; however, this embodiment is not limited to these. It is possible to employ a circuit structure where one pixel has three or more transistors and two or more capacitors. Moreover, a variety of circuit structures can be obtained by formation of an additional wiring.

Notes on Definitions of Terms

The following are definitions of the terms that are not mentioned in the above embodiments.

Switch

In this specification and the like, a switch is conducting (on state) or not conducting (off state) to determine whether current flows therethrough or not. Alternatively, a switch has a function of selecting and changing a current path.

Examples of a switch are an electrical switch, a mechanical switch, and the like. That is, any element can be used as a switch as long as it can control current, without limitation to a certain element.

Examples of the electrical switch are a transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), and a logic circuit in which such elements are combined.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

An example of a mechanical switch is a switch formed using a micro electro mechanical system (MEMS) technology, such as a digital micromirror device (DMD). Such a switch includes an electrode which can be moved mechanically, and operates by controlling conduction and non-conduction in accordance with movement of the electrode.

Channel Length

In this specification and the like, the channel length refers to, for example, a distance between a source and a drain in a region where a semiconductor (or a portion where a current flows in a semiconductor when a transistor is on) and a gate overlap with each other or a region where a channel is formed in a plan view of the transistor.

In one transistor, channel lengths in all regions are not necessarily the same. In other words, the channel length of one transistor is not fixed to one value in some cases. Therefore, in this specification, the channel length is any one of values, the maximum value, the minimum value, or the average value in a region where a channel is formed.

Channel Width

In this specification and the like, the channel width refers to, for example, the length of a portion where a source and a drain face each other in a region where a semiconductor (or a portion where a current flows in a semiconductor when a transistor is on) and a gate electrode overlap with each other, or a region where a channel is formed.

In one transistor, channel widths in all regions are not necessarily the same. In other words, the channel width of one transistor is not fixed to one value in some cases. Therefore, in this specification, the channel width is any one of values, the maximum value, the minimum value, or the average value in a region where a channel is formed.

Note that depending on transistor structures, a channel width in a region where a channel is formed actually (hereinafter referred to as an effective channel width) is different from a channel width shown in a top view of a transistor (hereinafter referred to as an apparent channel width) in some cases. For example, in a transistor having a three-dimensional structure, an effective channel width is greater than an apparent channel width shown in a top view of the transistor, and its influence cannot be ignored in some cases. For example, in a miniaturized transistor having a three-dimensional structure, the proportion of a channel region formed in a side surface of a semiconductor is high in some cases. In that case, an effective channel width obtained when a channel is actually formed is greater than an apparent channel width shown in the top view.

In a transistor having a three-dimensional structure, an effective channel width is difficult to measure in some cases. For example, to estimate an effective channel width from a design value, it is necessary to assume that the shape of a semiconductor is known as an assumption condition. Therefore, in the case where the shape of a semiconductor is not known accurately, it is difficult to measure an effective channel width accurately.

Therefore, in this specification, in a top view of a transistor, an apparent channel width that is a length of a portion where a source and a drain face each other in a region where a semiconductor and a gate electrode overlap with each other is referred to as a surrounded channel width (SCW) in some cases. Further, in this specification, in the case where the term "channel width" is simply used, it may denote a surrounded channel width or an apparent channel width. Alternatively, in this specification, in the case where the term "channel width" is simply used, it may denote an effective channel width in some cases. Note that the values of a channel length, a channel width, an effective channel width, an apparent channel width, a surrounded channel width, and the like can be determined by obtaining and analyzing a cross-sectional TEM image and the like.

Note that in the case where electric field mobility, a current value per channel width, and the like of a transistor are obtained by calculation, a surrounded channel width may be used for the calculation. In that case, a value different from one in the case where an effective channel width is used for the calculation is obtained in some cases.

Pixel

In this specification and the like, one pixel refers to one element whose brightness can be controlled, for example. Therefore, for example, one pixel expresses one color element by which brightness is expressed. Accordingly, in the case of a color display device formed of color elements of R (red), G (green), and B (blue), the smallest unit of an image is formed of three pixels of an R pixel, a G pixel, and a B pixel.

Note that the number of color elements is not limited to three, and more color elements may be used. For example, RGBW (W: white), RGB added with yellow, cyan, or magenta, and the like may be employed.

Display Element

In this specification and the like, a display element includes a display medium whose contrast, luminance, reflectivity, transmittance, or the like is changed by electrical or magnetic effect. Examples of the display element include an electroluminescent (EL) element, an LED chip (e.g., a white LED chip, a red LED chip, a green LED chip, and a blue LED chip), a transistor (a transistor that emits light depending on current), an electron emitter, a display element using a carbon nanotube, a liquid crystal element, electronic ink, an electrowetting element, an electrophoretic element, a plasma display panel (PDP), a display element using microelectromechanical system (MEMS) (e.g., a grating light valve (GLV), a digital micromirror device (DMD), a digital micro shutter (DMS), Mirasol (registered trademark), an interferometric modulator display (IMOD) element, a MEMS shutter display element, an optical-interference-type MEMS display element, and a piezoelectric ceramic display), a display element using a carbon nanotube, and a display element using a quantum dot. Examples of a display device having an EL element include an EL display. Examples of a display device having an electron emitter include a field emission display (FED), an SED-type flat panel display (SED: surface-conduction electron-emitter display), and the like. Examples of a display device including a liquid crystal element include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or an electrophoretic element include electronic paper. Examples of a display device containing quantum dots in each pixel include a quantum dot display. Note that quantum dots may be provided not as display elements but as part of a backlight. The use of quantum dots enables display with high color purity. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED chip, graphene or graphite may be provided under an electrode or a nitride semiconductor of the LED chip. Graphene or graphite may be a multilayer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED chip can be formed. Note that an AlN layer may be provided between the n-type GaN semiconductor layer including crystals and graphene or graphite. The GaN semiconductor layers included in the LED chip may be formed by MOCVD. Note that when the graphene is provided, the GaN semiconductor layers included in the LED chip can also be formed by a sputtering method. In a display element including microelectromechanical system (MEMS), a dry agent may be provided in a space where a display element is sealed (or between an element substrate over which the display element is placed and a counter substrate opposed to the element substrate, for example). Providing a drying agent can prevent MEMS and the like from becoming difficult to operate or deteriorating easily because of moisture or the like.

Connection

In this specification and the like, when it is described that "A and B are connected to each other", the case where A and B are electrically connected to each other is included in addition to the case where A and B are directly connected to each other. Here, the expression "A and B are electrically connected" means the case where electric signals can be transmitted and received between A and B when an object having any electric action exists between A and B.

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path." Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

This application is based on Japanese Patent Application serial no. 2015-124830 filed with Japan Patent Office on Jun. 22, 2015, the entire contents of which are hereby incorporated by reference.

What is claimed is:

1. A semiconductor device comprising:
   a first wiring;
   a second wiring;
   a first circuit; and
   a second circuit,
   wherein the first wiring has a function of transmitting a video signal to a pixel,
   wherein the first circuit is electrically connected to the second wiring,
   wherein the first circuit has a function of sensing a change in capacitance between the first wiring and the second wiring,
   wherein the second circuit is electrically connected to the first wiring,
   wherein the second circuit is capable of switching between a function of outputting the video signal and a function of outputting a driving signal for sensing the change in capacitance, and
   wherein the first circuit is configured to sense an information by the first wiring and the second wiring.

2. The semiconductor device according to claim 1,
   wherein the second circuit comprises a shift register, a first latch circuit, a second latch circuit, a D/A converter circuit, a switching circuit, and a buffer circuit,
   wherein the first wiring comprises n wirings, n being a natural number of 2 or more,
   wherein the first latch circuit is electrically connected to j×p third wirings, j and p each being a natural number of 2 or more,
   wherein the third wirings have a function of transmitting a p-bit digital signal and a function of transmitting the driving signal, the p-bit digital signal being the video signal,
   wherein the first latch circuit has a function of holding the digital signal from the third wirings on a j column basis in accordance with pulse signals from n/j columns output from the shift register,
   wherein the second latch circuit has a function of holding the digital signal held in the first latch circuit in accordance with a latch signal,
   wherein the D/A converter circuit has a function of generating an analog video signal in accordance with the digital signal held in the second latch circuit,
   wherein the switching circuit has a function of switching between transmission of the video signal to the buffer circuit and transmission of the driving signal to the buffer circuit,
   wherein the buffer circuit has a function of amplifying the video signal or the driving signal and outputting the amplified video signal or the amplified driving signal to the first wiring, and
   wherein the driving signal from any one of the third wirings is transmitted to the first wiring on a j column basis.

3. The semiconductor device according to claim 1,
   wherein the second circuit comprises a shift register, a first latch circuit, a second latch circuit, a D/A converter circuit, a switching circuit, and a buffer circuit,
   wherein the first wiring comprises n wirings, n being a natural number of 2 or more,
   wherein the first latch circuit is electrically connected to a third wiring,
   wherein the third wiring has a function of transmitting a digital signal, the digital signal being the video signal,
   wherein the first latch circuit has a function of holding the digital signal from the third wiring in accordance with a pulse signal output from the shift register,
   wherein the second latch circuit is electrically connected to h fourth wirings, h being a natural number of 2 or more,
   wherein the fourth wirings have a function of transmitting a latch signal for enabling holding of the digital signal held in the first latch circuit and a function of transmitting the driving signal,
   wherein the D/A converter circuit has a function of generating an analog video signal in accordance with the digital signal output from the second latch circuit,
   wherein the buffer circuit has a function of amplifying the video signal or the driving signal and outputting the amplified video signal or the amplified driving signal to the first wiring, and
   wherein the driving signal from any one of the fourth wirings is transmitted to the first wiring on a n/h column basis.

4. The semiconductor device according to claim 1,
   wherein the pixel comprises a liquid crystal element, and
   wherein the second wiring is electrically connected to a common electrode.

5. The semiconductor device according to claim 1,
   wherein the first circuit and the second circuit are provided in one integrated circuit.

6. The semiconductor device according to claim 1,
   wherein the pixel comprises a transistor, and
   wherein the first wiring and the second wiring are provided on a substrate side where the transistor is formed.

7. A touch panel comprising:
   the semiconductor device according to claim 1; and
   a display portion.

8. An electronic device comprising:
   the touch panel according to claim 7; and
   a control portion.

9. A semiconductor device comprising:
   a first pixel;
   a signal output circuit configured to output a video signal to the first pixel through a first wiring; and
   a signal sensing circuit electrically connected to a second wiring,
   wherein the signal sensing circuit is configured to sense whether touch is performed by the first wiring and the second wiring.

10. The semiconductor device according to claim 9, wherein the signal sensing circuit is configured to sense whether touch is performed by reading a change in capacitance between the first wiring and the second wiring.

11. The semiconductor device according to claim 9, wherein the signal output circuit comprises a shift register and a switching circuit.

12. The semiconductor device according to claim 9, wherein the signal output circuit and the signal sensing circuit are included in one integrated circuit.

13. A touch panel comprising:
the semiconductor device according to claim 9; and
a display portion.

14. An electronic device comprising:
the touch panel according to claim 13; and
a control portion.

15. The semiconductor device according to claim 1, wherein the information is whether touch is performed.

* * * * *